(12) United States Patent
Sonoda et al.

(10) Patent No.: US 7,296,939 B2
(45) Date of Patent: Nov. 20, 2007

(54) LASER MODULE WITH SEALED PACKAGE CONTAINING LIMITED OPTICAL COMPONENTS

(75) Inventors: Shinichiro Sonoda, Kanagawa-ken (JP); Kazuhiko Nagano, Kanagawa-ken (JP); Hideo Miura, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/188,648

(22) Filed: Jul. 26, 2005

(65) Prior Publication Data
US 2006/0018609 A1 Jan. 26, 2006

(30) Foreign Application Priority Data
Jul. 26, 2004 (JP) ............................. 2004-217540
Mar. 31, 2005 (JP) ............................. 2005-103812

(51) Int. Cl.
*G02B 6/36* (2006.01)
(52) U.S. Cl. ............................. 385/94; 385/88; 385/92; 385/93
(58) Field of Classification Search ................. 385/88, 385/92–94
See application file for complete search history.

(56) References Cited

U.S. PATENT DOCUMENTS

| | | | |
|---|---|---|---|
| 5,278,929 A * | 1/1994 | Tanisawa et al. ............. | 385/93 |
| 5,392,305 A | 2/1995 | Jakobson | |
| 5,537,503 A * | 7/1996 | Tojo et al. .................... | 385/93 |
| 5,631,991 A * | 5/1997 | Cohen et al. ................. | 385/93 |
| 5,845,031 A * | 12/1998 | Aoki ............................ | 385/92 |
| 5,940,564 A * | 8/1999 | Jewell ......................... | 385/93 |
| 6,040,934 A * | 3/2000 | Ogusu et al. ................ | 398/139 |
| 7,085,440 B2 * | 8/2006 | Kimura et al. ................ | 385/11 |
| 7,226,222 B2 * | 6/2007 | Nagano et al. ............... | 385/94 |
| 2001/0055451 A1 * | 12/2001 | Kuhara et al. ................ | 385/93 |
| 2002/0172476 A1 * | 11/2002 | Nagase et al. ............... | 385/92 |
| 2003/0044132 A1 * | 3/2003 | Nasu et al. ................... | 385/92 |
| 2005/0129374 A1 * | 6/2005 | Zbinden ...................... | 385/94 |
| 2005/0175300 A1 * | 8/2005 | Tanaka ........................ | 385/93 |
| 2006/0034571 A1 | 2/2006 | Nagano et al. | |
| 2006/0215966 A1 * | 9/2006 | Nagano et al. .............. | 385/88 |
| 2006/0215967 A1 * | 9/2006 | Nagano et al. .............. | 385/88 |
| 2006/0285805 A1 * | 12/2006 | Healy .......................... | 385/92 |

FOREIGN PATENT DOCUMENTS

| | | |
|---|---|---|
| JP | 11-54852 A | 2/1999 |
| JP | 11-167132 A | 6/1999 |
| JP | 2003-298170 A | 10/2003 |

* cited by examiner

*Primary Examiner*—Michelle Connelly-Cushwa
*Assistant Examiner*—Rhonda S. Peace
(74) *Attorney, Agent, or Firm*—Sughrue Mion Pllc.

(57) ABSTRACT

A laser module includes: one or more semiconductor laser elements which emit one or more divergent laser beams; one or more collimator lenses which collimate the one or more divergent laser beams; a condensing lens which condenses the one or more collimated laser beams, and make the one or more collimated laser beams converge at a convergence position; an optical fiber which is arranged in such a manner that the convergence position is located on the light-entrance end face; and a package which contains the one or more semiconductor laser elements and the one or more collimator lenses, does not contain the condensing lens and the light-entrance end face, and is hermetically sealed.

20 Claims, 13 Drawing Sheets

LASER MODULE WITH SEALED PACKAGE CONTAINING LIMITED OPTICAL COMPONENTS

BACKGROUND OF THE INVENTION

1. Field of the Invention

The present invention relates to a laser module in which a laser beam emitted from a semiconductor laser element is coupled to an optical fiber.

2. Description of the Related Art

Conventionally, the laser modules having the following construction are known as the pigtail-type laser modules, and widely used in the field of optical communications. The pigtail-type laser modules are constituted by a semiconductor laser element contained in a package, an optical fiber being fixed to the package and having an end which appears inside the package, and an optical condensing system which couples a laser beam emitted from the semiconductor laser element with a light-entrance end face.

As a variation of the above pigtail-type laser modules, the combined-laser modules are also known, for example, as indicated in Japanese Unexamined Patent Publication No. 2003-298170. In the combined-laser modules, a plurality of laser beams are emitted from one or more semiconductor laser elements, and enter an optical fiber which is arranged as in the pigtail-type laser modules, so that the plurality of laser beams are combined into a single laser beam having high intensity.

In the above laser modules, in order to stably maintain the state in which the semiconductor laser and the light-entrance end face of the optical fiber are optically coupled with a precision on the order of micrometers, the optical fiber, the optical condensing system, and the like are normally fixed by using a means of adhesion such as a solder or an adhesive.

In addition, in the laser modules for communications, in order to prevent deterioration of the laser caused by moisture in the atmosphere and the like, normally the package is hermetically sealed. The so-called CAN package is a typical sealing structure which protects semiconductor laser elements and laser end facets. Japanese Unexamined Patent Publication No. 2003-298170 also discloses hermetic sealing of a package containing the aforementioned one or more semiconductor laser elements and optical fiber, an optical condensing system, and the like.

In the laser modules as mentioned above, contaminants remaining in the hermetically sealed package are likely to be deposited on the light-emission end face of the semiconductor laser element and other optical components such as the optical condensing system and the optical fiber, so that the laser characteristics deteriorate. In particular, in the regions through which light passes and in which the optical density is high, the effect of depositing materials (i.e., the dust collection effect) is enhanced. Further, in the laser modules containing semiconductor laser elements which emit laser beams in the wavelength range of 350 to 500 nm (e.g., in the 400 nm band) such as GaN semiconductor laser elements, the photon energy is high. Therefore, photochemical reactions with the deposited materials are likely to occur, and the dust collection effect becomes further enhanced.

Typical examples of the contaminants are hydrocarbon compounds which enter the package from ambient atmospheres during manufacturing processes. The laser light polymerizes or decomposes such hydrocarbon compounds, and the materials produced by the polymerization or decomposition are deposited and impede increase in the optical output power.

In addition, it is known that ultraviolet light causes photochemical reactions with low-molecular-weight siloxane suspended in air, and the reaction products SiOx are deposited on optical glass window elements. Therefore, periodic replacement of the window elements exposed to air is recommended, for example, as indicated in Japanese Unexamined Patent Publication No. 11(1999)-054852.

Various proposals have been made for suppressing the aforementioned dust collection effect. For example, U.S. Pat. No. 5,392,305 indicates a proposal to mix 100 ppm or more of oxygen into sealing gas for decomposing the hydrocarbon compounds and the like.

Further, in optical systems in which ultraviolet light having a wavelength of 400 nm or smaller is applied to optical elements, arrangement of the optical elements in an atmosphere containing nitrogen of 99.9% or more has been proposed, for example, as indicated in Japanese Unexamined Patent Publication No. 11(1999)-167132.

Furthermore, it is known that the dust collection effect can be suppressed by degassing the inside of the package immediately before hermetically sealing the package.

However, in the case where a laser module in which a commercially available optical fiber covered with a primary coating of an ultraviolet-light-curing resin and a secondary coating of a polymer is fixed to a package, degassing is performed after the optical fiber is fixed to the package. That is, the fiber coatings exist in a degassing system. Therefore, chemical components are outgassed during the degassing operation, and thus the inside of the laser module is contaminated with the outgassed chemical components. In order to prevent this contamination, all the coatings of the optical fiber may be removed in advance. Nevertheless, since the optical fiber without coatings is prone to break, and it is difficult to handle an optical fiber without coatings, the removal of the coatings is not practical.

As indicated in Japanese Unexamined Patent Publication No. 2003-298170, hermetic sealing of a package containing a semiconductor laser element, an optical fiber, an optical condensing system, and the like is effective at preventing contamination of the inside of the laser module. However, in this case, the volume of the package becomes considerably large. When the volume of a hermetically sealed package is increased, the cost of the package is also increased, and assembly becomes more difficult. Therefore, in the case where a laser module is produced by hermetically sealing a large package containing a semiconductor laser element, an optical fiber, an optical condensing system, and the like, the cost of the laser module becomes very high.

SUMMARY OF THE INVENTION

The present invention has been developed in view of the above circumstances.

The aspect of the present invention is to provide a laser module which can achieve high reliability by suppressing deposition of contaminants, and can be produced at low cost.

(I) In order to accomplish the above aspect, the first aspect of the present invention is provided. According to the first aspect of the present invention, there is provided a laser module comprising: one or more semiconductor laser elements which emit one or more divergent laser beams; one or more collimator lenses which collimate the one or more divergent laser beams to obtain one or more collimated laser beams; a condensing lens which condenses the one or more collimated laser beams, and make the one or more collimated laser beams converge at a convergence position; an optical fiber which has a light-entrance end face and is arranged in such a manner that the convergence position is located on the light-entrance end face; and a first package which contains the one or more semiconductor laser elements and the one or more collimator lenses, does not contain the condensing lens and the light-entrance end face, and is hermetically sealed.

Preferably, the laser module according to the first aspect of the present invention may also have one or any possible combination of the following additional features (i) to (x).

(i) The laser module according to the first aspect of the present invention may further comprise a second package which contains the condensing lens, is hermetically sealed, and has lower sealing performance than the first package.

(ii) In the laser modules having the feature (i), the second package contains the first package.

(II) In order to accomplish the aforementioned aspect, the second aspect of the present invention is also provided. According to the second aspect of the present invention, there is provided a laser module comprising: one or more semiconductor laser elements which emit one or more divergent laser beams; one or more magnifying condenser lenses which condense the one or more divergent laser beams so as to make said one or more divergent laser beams converge at a convergence position; an optical fiber which has a light-entrance end face and is arranged in such a manner that the convergence position is located on the light-entrance end face; and a first package which contains the one or more semiconductor laser elements and the one or more magnifying condenser lenses, does not contain the light-entrance end face, and is hermetically sealed.

The one or more magnifying condenser lenses are condensing lenses each of which forms a magnified image of a light emission aperture of each of the one or more semiconductor laser elements.

In addition, preferably, the laser modules according to the first and second aspects of the present invention may also have one or any possible combination of the following additional features (iii) to (xiv).

(iii) The first package is hermetically sealed by one of fusion, welding, soldering using a flux-free solder, and adhesion using an adhesive which does not contain a silicon-based organic material.

(iv) The first package is filled with inert gas.

(v) In the laser modules having the feature (iv), the inert gas contains one or a mixture of oxygen gas, halogen gas, and halide gas at a concentration of 1 ppm or higher.

(vi) The laser modules according to the first and second aspects of the present invention may further comprise a third package which is separated from the first package, contains the light-entrance end face of the optical fiber, and is hermetically sealed.

(vii) In the laser modules having the feature (vi), the third package is hermetically sealed by one of fusion, welding, soldering using a flux-free solder, and adhesion using an adhesive which does not contain a silicon-based organic material.

(viii) In the laser modules having the feature (vi), the third package is filled with inert gas.

(ix) In the laser modules having the feature (viii), the inert gas contains one or a mixture of oxygen gas, halogen gas, and halide gas at a concentration of 1 ppm or higher.

(x) The one or more semiconductor laser elements have an oscillation wavelength of 350 to 500 nm.

(xi) The one or more semiconductor laser elements are realized by an array of single-cavity semiconductor laser elements, or a single multi-cavity semiconductor laser element, or an array of multi-cavity semiconductor laser elements, or a combination of at least one single-cavity semiconductor laser element and at least one multi-cavity semiconductor laser element.

(xii) The one or more semiconductor laser elements emit a plurality of laser beams which are combined into a single laser beam in the optical fiber.

(xiii) In the laser modules having the feature (xii), the one or more semiconductor laser elements are arranged so that the plurality of laser beams emitted from the one or more semiconductor laser elements are two-dimensionally arrayed along a plane perpendicular to the light-emission axes of the one or more semiconductor laser elements.

(xiv) The light-emission end face of the optical fiber is terminated with a connector.

(III) The laser modules according to the first and second aspects of the present invention have the following advantages.

(1) The optical density is high and the dust collection effect is enhanced at the light-emission end faces of the one or more semiconductor laser elements and the lens surfaces through which light passes. In the laser modules according to the present invention, the one or more semiconductor laser elements and the one or more collimator lenses (or the one or more magnifying condenser lenses) are contained in the first package, and the first package is hermetically sealed. Therefore, it is possible to suppress dust collection at the light-emission end faces of the one or more semiconductor laser elements and the lens surfaces through which light passes. Thus, the laser modules according to the present invention are highly reliable.

(2) Since the light-entrance end face of the optical fiber is not contained in the first package, it is possible to prevent contamination caused by outgassing from the resin coatings of the optical fiber. In particular, in the laser module according to the first aspect of the present invention, the condensing lens is also arranged outside the first package. Therefore, it is possible to prevent contamination of the light-emission end faces of the one or more semiconductor laser elements with volatile components emanated from an adhesive or the like used for fixing the condensing lens.

(3) Only the one or more collimator lenses or the one or more magnifying condenser lenses are contained in the first package as well as the light-emission end faces of the one or more semiconductor laser elements. Therefore, the volume of the first package in each of the laser modules according to the present invention is smaller than the volume of the package in the conventional laser modules, which contains all the optical components constituting each of the conventional laser modules. Since the cost of the hermetically sealed package markedly increases with the volume of the package, the cost of the package according to the present invention can be significantly reduced. Thus, the entire laser modules according to the present invention can be produced at low cost.

(4) If only the semiconductor laser elements are contained in a package, and the collimator lenses or the magnifying condenser lenses are arranged outside the package, the volume of the package can be further reduced. However, in this case, the divergent laser beams emitted from the semiconductor laser elements pass through a window which is required to be arranged in the package for passage of the laser beams, and the window is located at a location at which the diameters of the laser beams are still small, i.e., at which the optical density is very high. Therefore, the dust collection effect at the window is markedly enhanced, and the laser characteristics seriously deteriorate.

On the other hand, in the laser modules according to the present invention, the collimator lenses or the magnifying condenser lenses are also contained in the first package. Therefore, the diameters of the laser beams are great, i.e., the optical density is relatively low, at the location of a window arranged in the first package for passage of the laser beams. Thus, the dust collection effect at the window is reduced, and the deterioration of the laser characteristics can be suppressed.

(5) In the laser module according to the first aspect of the present invention, the optical condensing system which makes the laser beams enter the optical fiber is constituted by the collimator lenses and the condensing lens which is arranged outside the first package. Therefore, it is preferable to make provision for preventing contamination of the condensing lens in order to prevent deterioration of the laser characteristics of the laser module according to the first aspect of the present invention.

In the case where the condensing lens is contained in the second package which is hermetically sealed and has lower sealing performance than the first package, the cost of the second package is relatively low. Therefore, the total cost of the first and second packages is smaller than the cost of the conventional package which contains all of the semiconductor laser elements, the collimator lenses, and the condensing lens. Thus, the laser module according to the first aspect of the present invention can be produced at low cost.

Further, in the case where the second package contains the first package, the semiconductor laser elements and the collimator lenses are doubly sealed with the first and second packages. Therefore, the effect of preventing contamination of the semiconductor laser elements and the collimator lenses is further enhanced.

(6) In the case where the first package is hermetically sealed by one of fusion, welding, soldering using a flux-free solder, and adhesion using an adhesive which does not contain a silicon-based organic material, it is possible to suppress emanation of volatile components which causes contamination, and prevent contamination of the semiconductor laser elements and the like.

(7) In the case where the first package is filled with inert gas, it is possible to prevent entry of contaminated gas into the first package. Further, in the case where the inert gas contains one or a mixture of oxygen gas, halogen gas, and halide gas at a concentration of 1 ppm or higher, the effect of preventing contamination is enhanced since oxygen gas, halogen gas, and halide gas cause decomposition of hydrocarbon components and the like.

(8) In the case where the light-entrance end face of the optical fiber is contained in another package (the third package) which is hermetically sealed, it is possible to prevent dust collection at the light-entrance end face although the optical density is likely to become high. In this case, it is possible to arrange the first package and the third package in such a manner that the total volume of the first and third packages is smaller than the volume of a large, hermetically sealed package which contains all the constituents of the laser module. Therefore, the cost can be reduced by arranging the first and third packages as above, in comparison with the case where the above large, hermetically sealed package is used.

(9) In the case where the third package is hermetically sealed by one of fusion, welding, soldering using a flux-free solder, and adhesion using an adhesive which does not contain a silicon-based organic material, it is possible to suppress emanation of volatile components which causes contamination, and prevent contamination of the light-entrance end face of the optical fiber.

(10) In the case where the third package is filled with inert gas, it is possible to prevent entry of contaminated gas into the third package. Further, in the case where the inert gas contains one or a mixture of oxygen gas, halogen gas, and halide gas at a concentration of 1 ppm or higher, the effect of preventing contamination is enhanced since oxygen gas, halogen gas, and halide gas cause decomposition of hydrocarbon components and the like.

(11) In the case where the one or more semiconductor laser elements have an oscillation wavelength of 350 to 500 nm, the optical energy is great, and the dust collection effect is enhanced. Since the deposition of contaminants is prevented according to the present invention, the present invention is particularly effective at preventing deposition of contaminants in laser modules in which laser beams having the above oscillation wavelength are used.

(12) In the case where the one or more semiconductor laser elements emit a plurality of laser beams which are combined into a single laser beam in the optical fiber, the optical density at the light-entrance end face of the optical fiber becomes very high, and therefore the dust collection effect is enhanced. Since the deposition of contaminants on the light-entrance end face of the optical fiber is prevented by the provision of the third package, the provision of the third package is particularly effective at preventing deposition of contaminants in laser modules in which the one or more semiconductor laser elements are arranged as above.

(13) If a package containing all the constituents of a laser module is used in the case where one or more semiconductor laser elements are arranged so that a plurality of laser beams emitted from the one or more semiconductor laser elements are two-dimensionally arrayed along a plane perpendicular to the light-emission axes of the one or more semiconductor laser elements, the volume of the package becomes great. Since the first package according to the present invention is small, the present invention is particularly effective at reducing the cost of the laser modules in which the one or more semiconductor laser elements are arranged as above.

DESCRIPTION OF PREFERRED EMBODIMENTS

Figure 1:
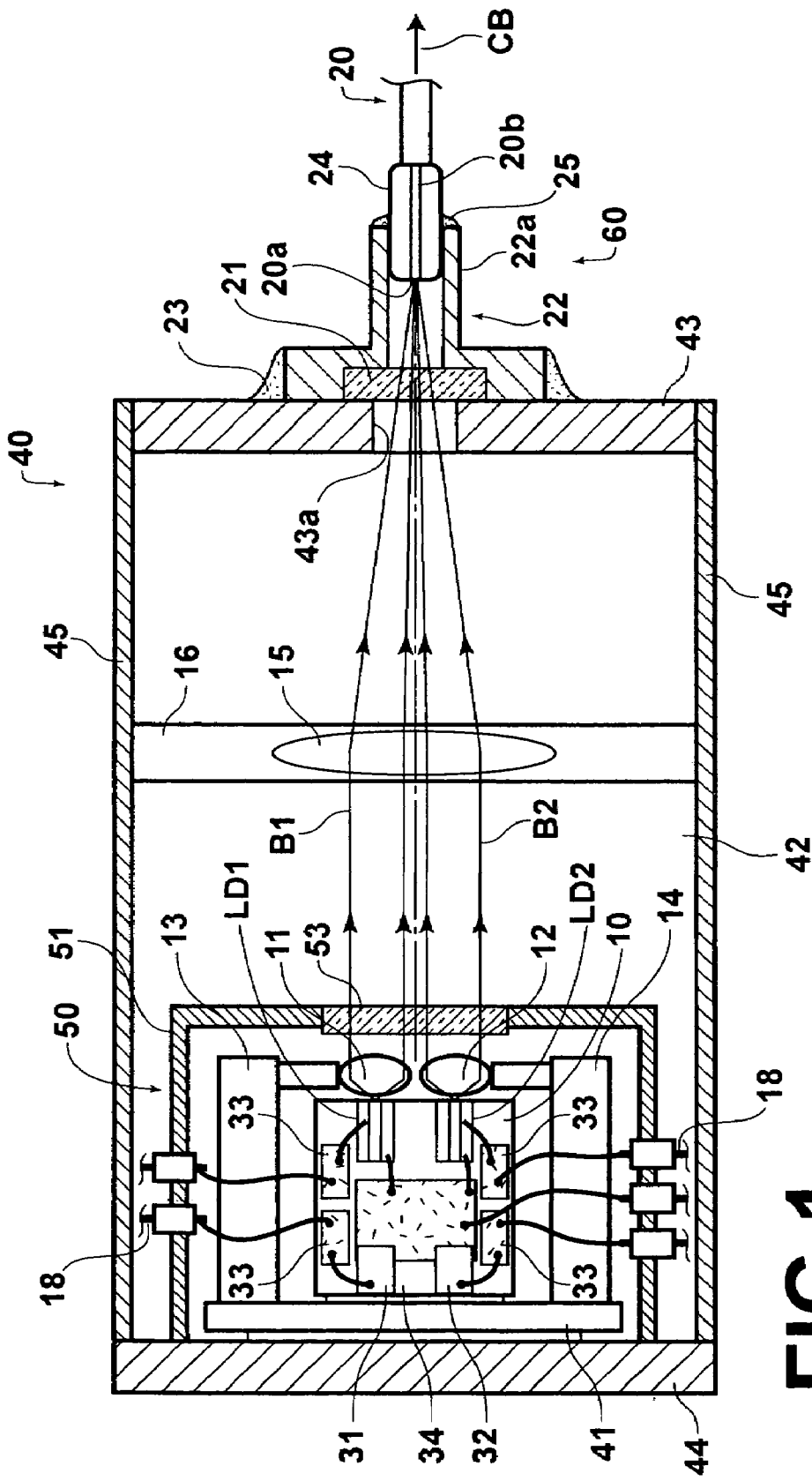
FIG. 1 is a plan view, partly in cross section, of a laser module according to a first embodiment of the present invention.

Embodiments of the present invention are explained in detail below with reference to drawings. In the drawings, equivalent elements and constituents are indicated by the same reference numbers even in drawings for different embodiments, and descriptions of the equivalent elements or constituents are not repeated in the following explanations unless necessary.

First Embodiment

Figure 2:
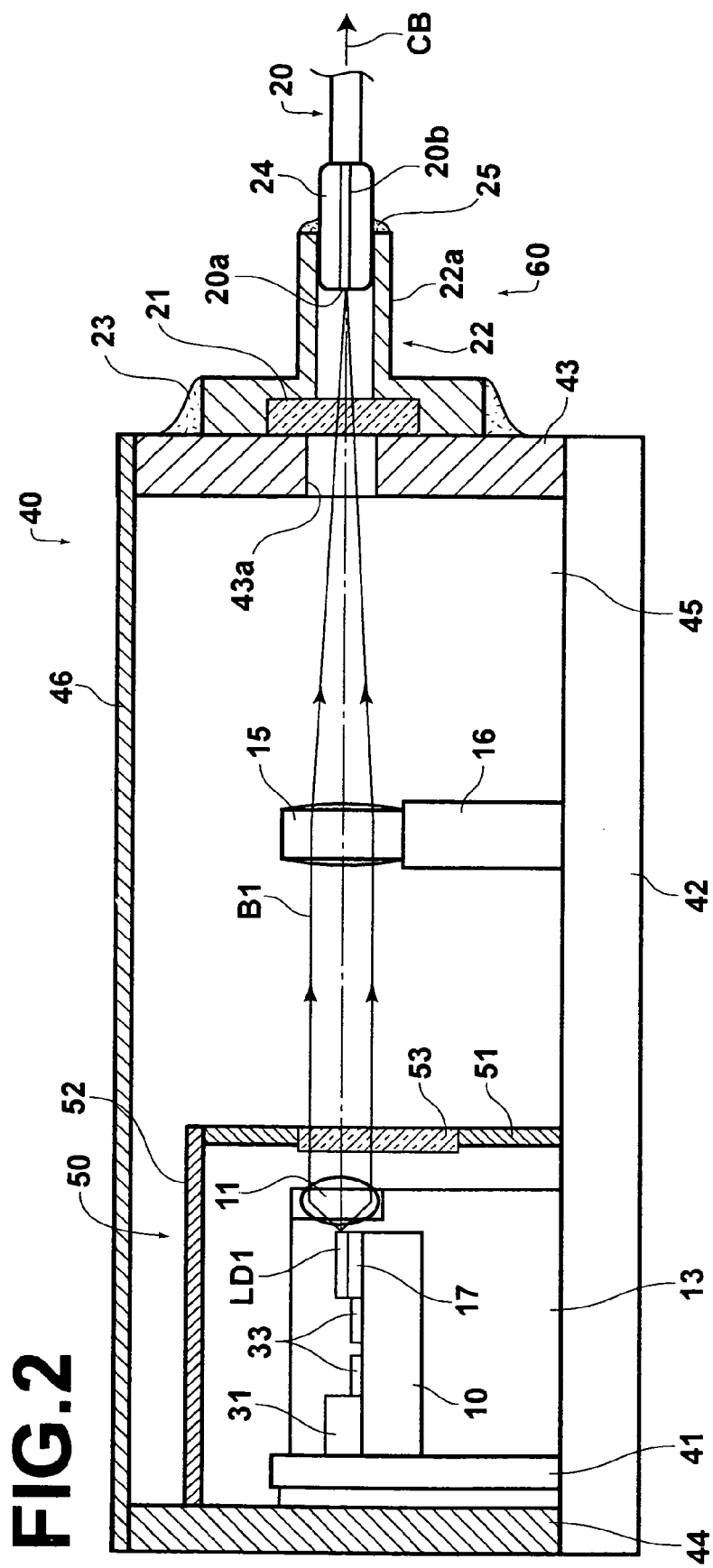
FIG. 2 is a side view, partly in cross section, of the laser module according to the first embodiment.

FIGS. 1 and 2 are respectively plan and side views, partly in cross section, of a laser module according to the first embodiment of the present invention.

As illustrated in FIGS. 1 and 2, the laser module according to the first embodiment comprises a plurality (e.g., two) of semiconductor lasers LD1 and LD2, a heat block (heat-dissipation block) 10, a plurality (e.g., two) of collimator lenses 11 and 12, a plurality (e.g., two) of collimator-lens holders 13, and 14, a condensing lens 15, a condensing-lens holder 16, and an optical fiber 20. The semiconductor lasers LD1 and LD2 are fixed on the upper surface of the heat block 10. The collimator lenses 11 and 12 collimate divergent laser beams B1 and B2 emitted from the semiconductor lasers LD1 and LD2. The collimator-lens holders 13 and 14 respectively hold the collimator lenses 11 and 12. The condensing lens 15 condenses the collimated laser beams B1 and B2 so that the laser beams B1 and B2 converge at an identical position. The condensing-lens holder 16 holds the condensing lens 15. The optical fiber 20 is arranged so that the above identical position is located at an end 20a (on the light-entrance end face) of the optical fiber 20.

In addition, a plurality (e.g., two) of photodiodes 31 and 32, four small electrode pads 33, and a single large electrode pad 34 are also fixed on the upper surface of the heat block 10. The photodiodes 31 and 32 detect backward emission light emitted from the semiconductor lasers LD1 and LD2 in the direction opposite to the laser beams B1 and B2.

Further, the collimator-lens holders 13 and 14, the condensing-lens holder 16, and a holding member 41 for holding the heat block 10 are fixed on a base plate 42, and a package 40 is formed by fixing a front plate 43, a rear plate 44, and two side plates 45 on the base plate 42, and adhesively fixing a cover plate 46 is to the upper end faces of the front plate 43, the rear plate 44, and the side plates 45.

Furthermore, a light-source package 50 is arranged in the package 40. The light-source package 50 is constituted by a vertical member 51 and a cover plate 52. The vertical member 51 has a U-shaped horizontal cross-section, the rear end faces of the vertical member 51 are fixed to the rear plate 44 of the package 40, and the cover plate 52 is adhesively fixed to the upper end faces of the vertical member 51. The light-source package 50 contains the heat block 10 and the collimator-lens holders 13 and 14. A transparent plate 53 being made of an optical glass or the like and realizing a window is inserted into the vertical member 51 so that the laser beams B1 and B2 can pass through the transparent plate 53, and is outputted from the light-source package 50.

GaN-based semiconductor laser elements having an oscillation wavelength of 350 to 500 nm are used as the semiconductor lasers LD1 and LD2, and mounted on the heat block 10 through a submount 17. For example, the InGaN-based semiconductor laser elements disclosed in Japanese Unexamined Patent Publication No. 2004-134555 can be used as the semiconductor lasers LD1 and LD2. For example, the submount 17 may be made of AlN, and an electric pattern may be formed on the submount 17. Alternatively, the submount 17 may be constituted by a ceramic pattern on which copper wirings are arranged. The submount 17 can be mounted in various manners. For example, the submount 17 as above may be directly fixed to the heat block 10 by soldering. Alternatively, a submount may be arranged for each component of the laser module.

The semiconductor lasers LD1 and LD2 and the photodiodes 31 and 32 are connected to the leads 18 through the electrode pads 33 and 34 to which the leads 18 are bonded. For example, the number of the leads 18 is five. The leads 18 are led out of the light-source package 50 in such a manner that the inside of the light-source package 50 is sealed off from the outside. In addition, the leads 18 are further led out of the package 40 in a similar manner (although not shown).

The condensing lens 15 is a truncated lens having a shape obtained by cutting out a portion of an axisymmetric spherical lens so that the portion contains the optical axis of the spherical lens, and the top and bottom surfaces of the truncated lens are flat. The condensing lens 15 is fixed to the condensing-lens holder 16, for example, by bonding a flat bottom surface of the condensing lens 15 to the upper surface of the condensing-lens holder 16. Alternatively, the condensing lens 15 may be a normal axisymmetric spherical lens, an aspherical lens, a pair of cylindrical lenses which are combined so as to increase the circularity of each of the laser beams B1 and B2, or the like.

A light-passage hole 43a is arranged in the front plate 43 of the package 40, and a transparent plate 21 made of glass or the like is arranged on the front surface of the front plate 43 so as to hermetically close the light-passage hole 43a. The transparent plate 21 is fixed to a ferrule holder 22, which has a cylindrical portion 22a shaped to hold a ferrule 24 having a cylindrical shape. The ferrule holder 22 is fixed to the front plate 43 of the package 40 with a flux-free solder 23. The resin coating of the optical fiber 20 in the vicinity of the light-entrance end face 20a is removed so as to expose the bare optical fiber 20b, and the bare optical fiber 20b is inserted into a small hole which is formed through the center of the ferrule 24. Then, the ferrule 24 is inserted into the cylindrical portion 22a of the ferrule holder 22, and fixed to the cylindrical portion 22a with a flux-free solder 25. Thus, the optical fiber 20 is fixed to the package 40.

In the laser module having the above construction, the divergent laser beams B1 and B2 emitted from the semiconductor lasers LD1 and LD2 are collimated by the collimator lenses 11 and 12, respectively, and outputted from the light-source package 50 through the transparent plate 53. Then, the collimated laser beams B1 and B2 are condensed by the condensing lens 15, and outputted from the package 40 through the transparent plate 21, so that both the laser beams B1 and B2 converge on the light-entrance end face 20a (specifically, the end face of the core) of the optical fiber 20. Thus, the laser beams B1 and B2 enter and propagate through the optical fiber 20. At this time, the laser beams B1 and B2 are combined in the optical fiber 20 to generate a high-intensity, combined laser beam CB, which is then outputted from the optical fiber 20. It is preferable that the light-emission end of the optical fiber 20 be terminated. Details of the termination of the optical fiber are explained later.

As mentioned before, in addition to the laser beams B1 and B2 as forward emission light, the semiconductor lasers LD1 and LD2 emit the backward emission light (not shown) in the direction opposite to the laser beams B1 and B2. The intensities of the backward emission light from the semiconductor lasers LD1 and LD2 are detected by the photodiodes 31 and 32, respectively, and the driving currents of the semiconductor lasers LD1 and LD2 are APC (Automatic Power Control) controlled according to the outputs of the photodiodes 31 and 32, respectively, so that the output power of the combined laser beam CB is maintained constant.

Alternatively, in order to perform APC in a laser module having a plurality of semiconductor laser elements, it is possible to input the signals corresponding to the detected backward emission light into a multi-channel driver, and control the respective semiconductor laser elements by using the multi-channel driver. Further, it is also possible to split off a portion from each of the laser beams B1 and B2 after the laser beams B1 and B2 are outputted from the light-source package 50 (or after the laser beams B1 and B2 are condensed by the condensing lens 15) by using a beam splitter or the like, detect the intensities of the split portions of the collimated laser beams B1 and B2 (instead of the backward emission light) by using optical detectors, and perform APC on the basis of the outputs of the optical detectors.

Hereinbelow, prevention of contamination of the surfaces through which the laser beams B1 and B2 pass is explained.

As explained above, the light-source package 50 which contains the semiconductor lasers LD1 and LD2 and the collimator lenses 11 and 12 is constituted by the vertical member 51 and the cover plate 52, and is hermetically sealed. A flux-free solder or an adhesive which does not contain a silicon-based organic material is used for fixing the cover plate 52 to the vertical member 51, and the cover plate 52 and the vertical member 51 to the base plate 42 or the rear plate 44. Alternatively, fusion or welding may be used for fixing the above plates and members. In addition, the other components and parts arranged in the light-source package 50 are also fixed or bonded in similar manners. Thus, it is possible to suppress emanation of volatile components which causes contamination. Further, it is preferable to perform degassing in order to remove volatile components remaining in the light-source package 50.

The adhesive which does not contain a silicon-based organic material is, for example, one of the adhesive mixtures which are disclosed in Japanese Unexamined Patent Publication No. 2001-177166 and do not contain a silane coupling agent, where each of the adhesive mixtures contains an alicyclic epoxy compound, a compound having an oxetanyl group, and a photoreaction initiator of an onium salt as a catalyst.

The flux-free solders used in the laser module according to the first embodiment are, for example, Sn—Pb, Sn—In, Sn—Pb—In, Au—Sn, Ag—Sn, Sn—Ag—In, or the like. Although the flux contained in the most soldering materials causes contamination, it is possible to prevent production of contaminants by use of the flux-free solders. In addition, from the environmental viewpoint, it is preferable to use lead-free solders.

It is possible to perform welding by using a commercially available, seam welding machine, for example, one of the seam welders which are available from Nippon Avionics Co., Ltd. Specifically, it is possible to perform a seal weld of the light-source package 50, for example, by placing the cover plate 52 on the vertical member 51, and applying a high voltage to the regions at which the cover plate 52 and the vertical member 51 are in contact, with a seam welding machine. In addition, it is possible to perform fusion by using a commercially available, fusion machine, for example, the fusion machine FITEL S-2000, which is available from Furukawa Electric Co., Ltd.

The above features in the construction of the laser module according to the first embodiment bring the following advantages.

(a) Since the semiconductor lasers LD1 and LD2 and the collimator lenses 11 and 12 are arranged in the light-source package 50 which is hermetically sealed so that contaminants inside the light-source package 50 are sufficiently reduced, it is possible to suppress dust collection on the light-emission end faces of the semiconductor lasers LD1 and LD2 and the surfaces of the collimator lenses 11 and 12 through which light passes (at which the optical density is high and the dust collection effect is enhanced). Thus, the laser module according to the first embodiment has high reliability.

(b) Since the light-entrance end face of the optical fiber 20 is not contained in the light-source package 50, it is possible to prevent contamination caused by outgassing from the resin coating of the optical fiber 20. In addition, according to the first embodiment, the condensing lens 15 is arranged outside the light-source package 50. Therefore, it is also possible to prevent contamination of the light-emission end faces of the semiconductor lasers LD1 and LD2 and other surfaces by volatile components emanated from an adhesive used for fixing the condensing lens 15.

(c) Since only the semiconductor lasers LD1 and LD2 and the collimator lenses 11 and 12 are arranged in the hermetically sealed, light-source package 50, the volume of the light-source package 50 can be smaller than the volume of the conventional hermetically sealed packages each containing all the constituents of a laser module. Since the cost of the hermetically sealed package markedly increases with the volume of the package, the cost of the light-source package 50 can be significantly reduced. Thus, the entire laser module according to the first embodiment can be produced at low cost.

(d) If only the semiconductor lasers LD1 and LD2 are contained in a light-source package 50, and the collimator lenses 11 and 12 are arranged outside the light-source package 50, the volume of the light-source package can be further reduced. However, in this case, the window (realized by the transparent plate 53) of the light-source package 50 should be located between the semiconductor lasers LD1 and LD2 and the collimator lenses 11 and 12 as illustrated in FIGS. 1 and 2. Therefore, the divergent laser beams B1 and B2 emitted from the semiconductor lasers LD1 and LD2 pass through the window at a location at which the diameters of the laser beams B1 and B2 are still small, i.e., at which the optical density is very high. Thus, the dust collection effect at the window is markedly enhanced, and the laser characteristics seriously deteriorate.

On the other hand, in the laser modules according to the first embodiment, the collimator lenses 11 and 12 are also contained in the light-source package 50. Therefore, the laser beams B1 and B2 after passage through the collimator lenses 11 and 12 pass through the transparent plate 53 at a location at which the diameters of the laser beams B1 and B2 are great, i.e., at which the optical density is relatively low. Thus, the dust collection effect at the transparent plate 53 and the deterioration of the laser characteristics can be reduced.

(e) Since the package 40 containing the light-source package 50 and the condensing lens 15 is also hermetically sealed, it is possible to prevent contamination of the surfaces of the condensing lens 15 through which laser beams pass. In addition, the package 40 is hermetically sealed in such a manner that the sealing performance of the package 40 is lower than the sealing performance of the light-source package 50. Therefore, it is possible to make the total cost of the packages 50 and 40 smaller than the cost of the conventional hermetically sealed package which contains all of the semiconductor laser elements, the collimator lenses, and the condensing lens. Thus, the laser module according to the first embodiment can be produced at low cost.

Further, since the package 40 contains the light-source package 50, the semiconductor lasers LD1 and LD2 and the collimator lenses 11 and 12 are doubly sealed off from the atmosphere with the packages 50 and 40. Therefore, the effect of preventing contamination of the semiconductor lasers LD1 and LD2 and the collimator lenses 11 and 12 is further enhanced.

In addition, in the laser module according to the first embodiment, the light-source package 50 is filled with inert gas, so that entry of contaminated gas into the light-source package 50 is prevented. The inert gas may be, for example, nitrogen gas or rare gas. In addition, the inert gas may contain one or a mixture of oxygen gas, halogen gas, and halide gas at a concentration of 1 ppm or higher. For example, the light-source package 50 may be filled with the clean air, which is a mixture of nitrogen gas and oxygen gas at the same ratio as the atmosphere.

In the case where the inert gas contains one or a mixture of oxygen gas, halogen gas, and halide gas at a concentration of 1 ppm or higher, the effect of preventing contamination is enhanced since oxygen gas, halogen gas, and halide gas cause decomposition of hydrocarbon components and the like.

When the oxygen content in the sealed atmosphere is 1 ppm or more, deterioration of the laser module can be suppressed more effectively. This is because the oxygen contained in the sealed atmosphere oxidizes and decomposes solid materials produced by photodecomposition of hydrocarbon components.

The halogen gas includes chlorine ($Cl_2$) gas, fluorine ($F_2$) gas, and the like, and the halide gas includes gaseous compounds containing a halogen atom such as chlorine (Cl), bromine (Br), iodine (I), or fluorine (F).

Specifically, the halide gas includes CF3Cl, CF2Cl2, CFCl3, CF3Br, CCl4, CCl4-O2, C2F4Cl2, Cl—H2, PCl3, CF4, SF6, NF3, XeF2, C3F8, CHF3, and the like. Compounds of fluorine or chlorine with carbon (C), nitrogen (N), sulfur (S), or xenon (Xe) are preferable for use in the present invention, and compounds containing the fluorine atom are particularly preferable.

Although inclusion of even a very small amount of halogen-based gas (halogen or halide gas) produces the effect of suppressing the deterioration of the laser, in order to make the effect prominent, it is preferable that the concentration of halogen-based gas in the sealed atmosphere be 1 ppm or more. The inclusion of halogen-based gas in the sealed atmosphere suppresses the deterioration of the laser characteristics because the halogen-based gas in the sealed atmosphere decomposes deposited materials which are produced by photodecomposition of organic silicon compound gas.

Further, in the laser module according to the first embodiment, the light-entrance end face 20a of the optical fiber 20 is also arranged in another package 60 which is hermetically sealed. Specifically, the package 60 is realized by the ferrule 24, the transparent plate 21, and the ferrule holder 22 in which the ferrule 24 is inserted. The light-entrance end face 20a of the optical fiber 20 is arranged in the package 60.

The package 60 is hermetically sealed as indicated in detail below.

First, the resin coating of the optical fiber 20 in the vicinity of the light-entrance end face 20a is removed so as to expose the bare optical fiber 20b, the bare optical fiber 20b is inserted into the small hole formed through the center of the ferrule 24, and fused with the ferrule 24 so that air cannot pass through the gap between the bare optical fiber 20b and the ferrule 24. The outer surface of the ferrule 24 is metalized by evaporation or plating, and the end surface of the ferrule 24 in which the bare optical fiber 20b is inserted is polished into a spherical or planar shape, and then AR (antireflection) coated by evaporation. When the end surface of the ferrule 24 is AR coated, a jig designed for cooling the fiber coating is used so that the heat at the evaporated end of the bare optical fiber 20b does not propagate to the fiber coating during the evaporation. In advance, the entire surface of the ferrule holder 22 is gold plated, and degassing is performed. Then, the ferrule 24 is fixed to the ferrule holder 22 with the flux-free solder 25 so that air cannot pass through the gap between the ferrule 24 and the ferrule holder 22. The surfaces on both sides of the transparent plate 21 are AR coated in advance, and the transparent plate 21 is also fixed to the ferrule holder 22 with a flux-free solder so that air cannot pass through the gap between the transparent plate 21 and the ferrule holder 22. Thereafter, the ferrule holder 22 is fixed to the front plate 43 with the flux-free solder 23 so that air cannot pass through the gap between the ferrule holder 22 and the front plate 43.

It is possible to adjust the position of the optical fiber 20 so that the laser beams B1 and B2 converge at the center of the core of the bare optical fiber 20b on the light-entrance end face 20a, by moving the ferrule holder 22 in the vertical and horizontal directions along the front plate 43 when the ferrule holder 22 is fixed to the front plate 43.

The above construction related to the package 60 brings the following additional advantages.

(a') In the above construction of the laser module according to the first embodiment, the light-entrance end face 20a of the optical fiber 20 is isolated from the atmosphere, it is possible to effectively prevent deposition of contaminants on the light-entrance end face 20a, through which the laser beams B1 and B2 enter the optical fiber 20 with high optical density. Alternatively, it is possible to prevent the contamination of the light-entrance end face 20a by covering the light-entrance end face 20a with a protection member made of a transparent material, instead of arranging the light-entrance end face 20a in the hermetically sealed package 60.

(b') Even in the case where the package 60 is formed as explained above in addition to the light-source package 50, it is possible to arrange the packages 50 and 60 in such a manner that the total volume of the hermetically sealed packages is smaller than the volume of a large, hermetically sealed package which contains all the constituents of the laser module, and therefore the total cost of the laser module can be reduced in comparison with the case where the above large, hermetically sealed package is used.

(c') Since the package 60 is hermetically sealed with a flux-free solder, it is possible to suppress emanation of volatile components which causes contamination, and prevent contamination of the light-entrance end face 20a of the optical fiber 20 with the volatile components. Alternatively, even in the case where the package 60 is hermetically sealed by one of fusion, welding, and adhesion using an adhesive which does not contain a silicon-based organic material, it is also possible to achieve similar advantages.

(d') It is preferable that the package 60 be filled with inert gas, and the inert gas contain one or a mixture of oxygen gas, halogen gas, and halide gas at a concentration of 1 ppm or higher. In this case, advantages similar to the advantages of the filler gas in the light-source package 50 are obtained.

(e') In the laser module according to the first embodiment, the laser beams B1 and B2 emitted from the semiconductor lasers LD1 and LD2 have a wavelength of 350 to 500 nm. That is, the optical energy is great, and the dust collection effect is enhanced. Since the deposition of contaminants is prevented in the laser module according to the first embodiment, the construction of the first embodiment of the present invention is particularly effective at preventing deposition of contaminants in the laser modules in which laser beams having the above wavelength are used.

(f') In the case where the one or more semiconductor laser elements emit a plurality of laser beams which are combined into a single laser beam in the optical fiber, the optical density at the light-entrance end face 20a of the optical fiber 20 becomes very great, and therefore the dust collection effect is enhanced. Since the deposition of contaminants on the light-entrance end face 20a of the optical fiber 20 is prevented by the provision of the package 60, the provision of the package 60 is particularly effective at preventing deposition of contaminants in the laser modules in which the one or more semiconductor laser elements are arranged as above.

(g') For example, it is possible to stack four semiconductor laser elements in two layers (i.e., arrange a pair of semiconductor lasers as the semiconductor lasers LD1 and LD2 in each of upper and lower layers), and combine laser beams emitted from the four semiconductor laser elements in an optical fiber as the optical fiber 20. In the case where one or more semiconductor laser elements are arranged so that laser beams emitted from the one or more semiconductor laser elements are two-dimensionally arrayed along a plane perpendicular to the light-emission axes of the one or more semiconductor laser elements, the light-source package 50 is required to have a large volume. Since the light-source package 50 according to the present invention is small, the present invention is particularly effective at reducing the cost of a laser module in which the one or more semiconductor laser elements are arranged as above.

Second Embodiment

Hereinbelow, the second embodiment of the present invention is explained with reference to FIG. 3, which is a plan view, partly in cross section, of a laser module according to the second embodiment of the present invention.

The laser module according to the second embodiment is basically different from the first embodiment in that magnifying condenser lenses 61 and 62 are used instead of the collimator lenses 11 and 12 and the condensing lens 15, and the light-source package 50 contains the semiconductor lasers LD1 and LD2 and the magnifying condenser lenses 61 and 62. In addition, in the second embodiment, the photodiodes 31 and 32, which are arranged in the first embodiment for monitoring the backward emission light, are not used.

Figure 3:
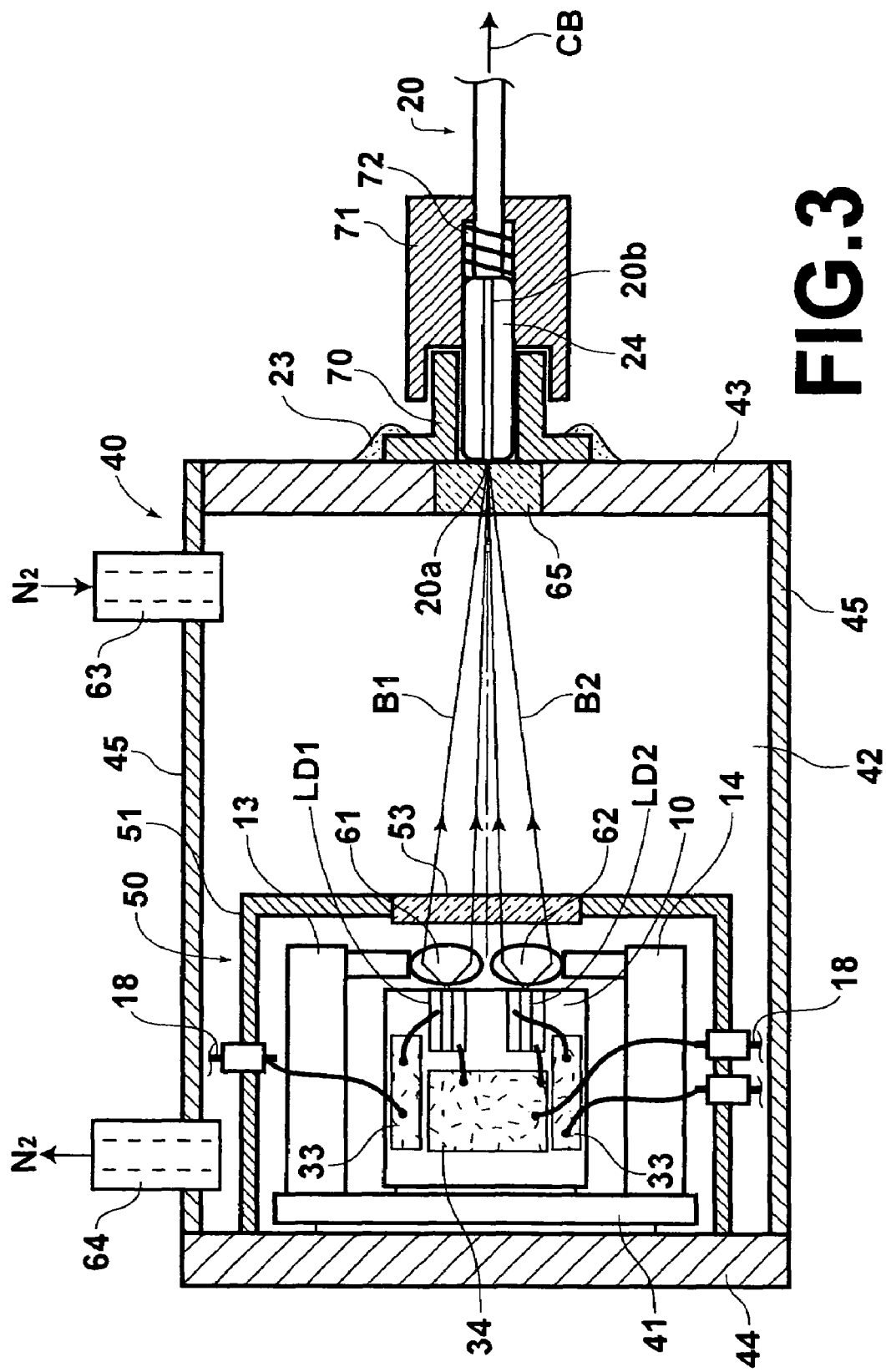
FIG. 3 is a plan view, partly in cross section, of a laser module according to a second embodiment of the present invention.

As illustrated in FIG. 3, in the laser module according to the second embodiment, the laser beams B1 and B2 emitted from the semiconductor lasers LD1 and LD2 are respectively collimated by the magnifying condenser lenses 61 and 62, and converge on the core end face in the light-entrance end face 20a of the optical fiber 20. Thus, the laser beams B1 and B2 enter and propagate through the optical fiber 20, so that the laser beams B1 and B2 are combined and the combined laser beam CB is outputted from the optical fiber 20 with high intensity.

Since the semiconductor lasers LD1 and LD2 and the magnifying condenser lenses 61 and 62 are contained in the light-source package 50, it is possible to prevent contamination of the semiconductor lasers LD1 and LD2 and the magnifying condenser lenses 61 and 62 in a basically similar manner to the prevention of contamination of the semiconductor lasers LD1 and LD2 and the collimator lenses 11 and 12 in the first embodiment.

The laser beams B1 and B2 converge after passage through the magnifying condenser lenses 61 and 62. However, the diameters of the laser beams B1 and B2 are relatively large and the optical densities of the laser beams B1 and B2 are relatively low at the position at which the laser beams B1 and B2 pass through the transparent plate 53, since the position of the transparent plate 53 is relatively near to the magnifying condenser lenses 61 and 62. Therefore, the dust collection effect at the transparent plate 53 is not great, and thus deterioration of the laser characteristics can be reduced.

In addition, according to the second embodiment, an inert-gas-introduction tube 63 and an inert-gas-discharge tube 64 are arranged through the side plates 45 of the package 40 so that the inert gas such as nitrogen gas is supplied to the package 40 through the inert-gas-introduction tube 63, circulates round the package 40, and is discharged through the inert-gas-discharge tube 64. Since the package 40 is filled with the inert gas as above, it is possible to prevent entry of contaminants into the package 40, and deposition of the contaminants on the transparent plate 53 and a transparent plate 65 (inserted in the front plate 43 as illustrated in FIG. 3) through which the laser beams B1 and B2 pass.

The above circulative supply of the inert gas is more effective in the laser module in which the output power of the laser beams B1 and B2 is high and the transparent plates 53 and 65 are likely to be contaminated. The above circulative supply of the inert gas can also be used in the laser module illustrated in FIGS. 1 and 2.

Further, in the laser module according to the second embodiment, the optical fiber 20 is coupled to the package 40 in a different manner from the first embodiment. In the laser module according to the second embodiment, the tip-side portion (on the left side in FIG. 3) of the ferrule 24 in which the bare optical fiber 20b is inserted is inserted in a receptacle 70 which is formed to hold the ferrule 24, and the receptacle 70 is fixed to the front plate 43 of the package 40 with the flux-free solder 23. The tail-side portion (on the right side in FIG. 3) of the ferrule 24 is inserted in a connector 71 in a slidable manner. In the connector 71, the ferrule 24 is pressed toward the front plate 43 by a compression spring 72. The connector 71 is fixed to the receptacle 70 by fitting with the receptacle 70 or by screwing the connector 71 onto the receptacle 70.

Specifically, first, the tail-side portion of the ferrule 24 is inserted in the connector 71 in which the compression spring 72 is inserted in advance, and then the connector 71 is fixed to the receptacle 70 so that the tip-side portion of the ferrule 24 in which the bare optical fiber 20b is inserted is inserted into the receptacle 70. At this time, the ferrule 24 is pressed by the compression spring 72 toward the transparent plate 65, so that the light-entrance end face 20a in the ferrule 24 is pressed against the transparent plate 65 and brought into contact with the transparent plate 65. Thus, it is possible to prevent deposition of contaminants on the light-entrance end face 20a or the transparent plate 65.

Furthermore, the manner of coupling the optical fiber 20 to the package 40 is not limited to the manners used in the first and second embodiments. The optical fiber 20 can be coupled to the package 40 by using any of the known structures for coupling an optical fiber to a sealed package.

Termination and Connection of Optical Fiber

Hereinbelow, termination of the optical fiber 20 and structures for connecting optical fibers are explained with reference to FIGS. 4 to 8. The optical fiber 20 in each of FIGS. 4 to 8 is an optical fiber which is terminated, and corresponds to the optical fiber 20 in either of the laser modules according to the first and second embodiments.

<First Structure>

First, the first structure for connecting optical fibers and a manner of termination associated with the first structure are explained below with reference to FIG. 4, which is a cross-sectional side view of the first structure for connecting optical fibers.

Figure 4:
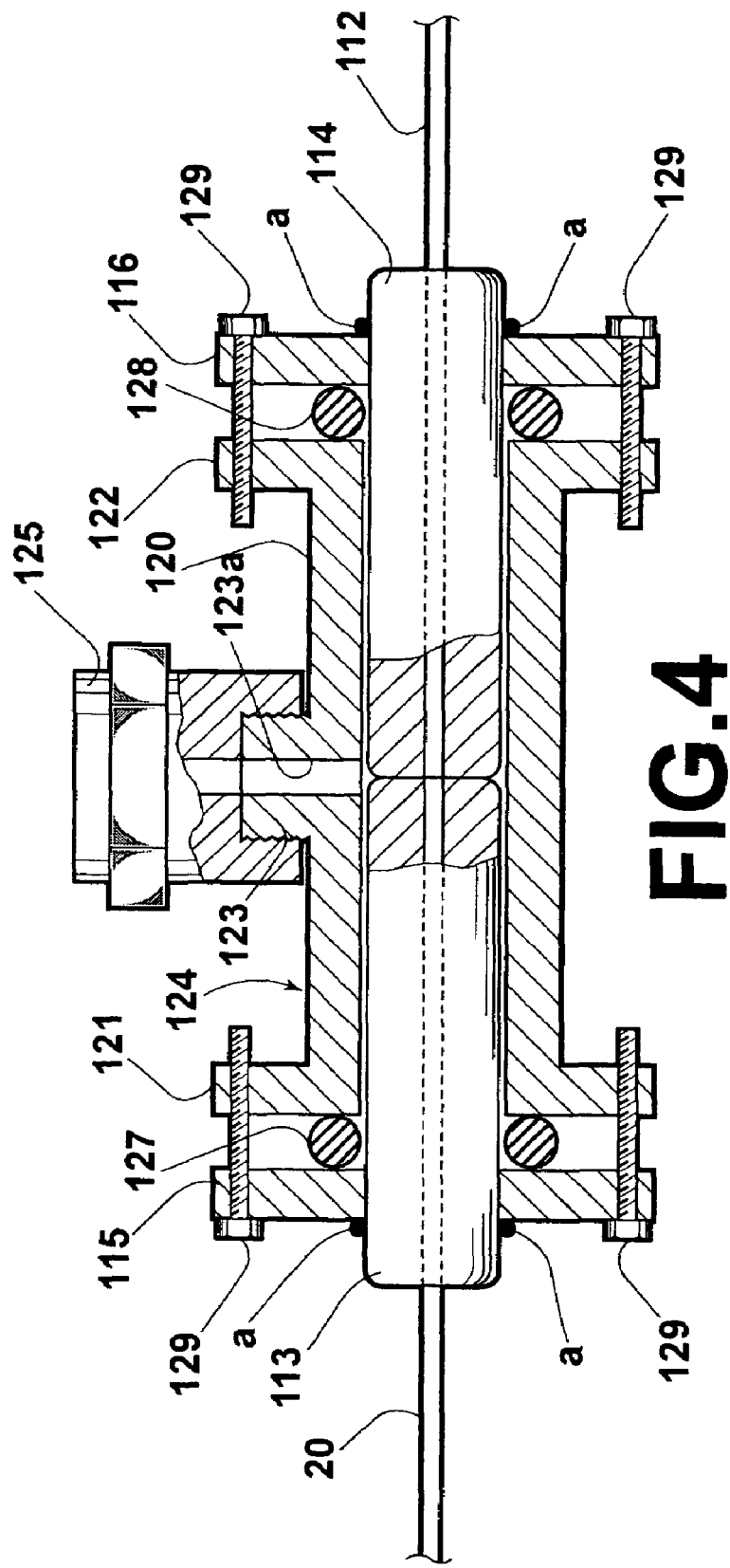
FIG. 4 is a cross-sectional side view of a first structure for connecting optical fibers.

In the first structure illustrated in FIG. 4, near-end portions of two optical fibers 20 and 112 are respectively inserted into and fixed to the ferrules 113 and 114, and flanges 115 and 116 each having an annular shape are fixed to the ferrules 113 and 114 at vicinities of the rear ends of the ferrules 113 and 114, respectively. An O-ring 127 is placed around the ferrule 113 in contact with the inner face of the flange 115, and an O-ring 128 is placed around the ferrule 114 in contact with the inner face of the flange 116. The ferrules 113 and 114 are inserted into a sleeve tube 120 constituting a connector 124 from both ends of the sleeve tube 120. That is, the termination of the optical fiber 20 is realized by the attachment of the ferrule 113.

The ferrules 113 and 114 are formed of ceramic, glass, metal, or a combination of the ceramic, glass, and metal. In the case where the ferrules 113 and 114 are formed of ceramic or glass, it is preferable to metalize the side surfaces of the ferrules 113 and 114 by metal plating or sputtering. After the ferrules 113 and 114 are fixed to the optical fibers 20 and 112, the tips of the ferrules 113 and 114 are polished into a spherical or planar shape.

The sleeve tube 120 constituting the connector 124 has an internal diameter slightly greater than the external diameter of the ferrules 113 and 114. Flanges 121 and 122 are formed at both ends of the sleeve tube 120, and a gas-introduction portion 123 having a through hole 123a which connects the inside and the outside of the sleeve tube 120 is arranged at approximately the middle of the length of the sleeve tube 120. A screw thread is formed on the external surface of the gas-introduction portion 123, and a valve 125 for closing the through hole 123a is fixed to the gas-introduction portion 123 by screwing the valve 125 onto the gas-introduction portion 123.

The flanges 115 and 116 are fixed to the ferrules 113 and 114 so that the gaps between the flanges 115 and 116 and the ferrules 113 and 114 are sealed along the entire circumferences of the ferrules 113 and 114, respectively, for example, at the positions indicated by black circles a in FIG. 4 by using, for example, a solder, which is preferably a flux-free solder not emanating organic gas.

After the ferrules 113 and 114 are inserted into the sleeve tube 120 of the connector 124 from the front portions of the ferrules 113 and 114, the flanges 115 and 116 are fixed to the flanges 121 and 122 through the O-rings 127 and 128, respectively, with an appropriate number of bolts 129. Thus, the inside of the connector 124 is sealed off from the outside with the O-rings 127 and 128 and the flanges 115 and 116. In addition, at this time, tips of the optical fiber cores are brought into contact with and pressed against each other, and the tips of the optical fiber cores are coaxially aligned. Thus, the optical fibers 20 and 112 are optically connected. Further, it is preferable that the O-rings 127 and 128 are made of a fluorocarbon polymer.

While the operation of connecting the optical fibers 20 and 112 is performed, inert gas is introduced into the connector 124 by placing the connector 124 in an atmosphere of inert gas as mentioned before, connecting the valve 125 to a vacuum pump (not shown), and reducing the internal pressure of the connector 124. Thereafter, the valve 125 is closed. Thus, when the inside of the connector 124 is sealed up by inserting the ferrules 113 and 114 as mentioned before, the inside of the connector 124 is filled with the inert gas.

In the case where the connector 124 is filled with the inert gas as above, and at least portions of the tips of the cores of the optical fibers 20 and 112 are not in contact, the at least portions are surrounded by the inert gas. Therefore, organic materials and the like which cause the aforementioned dust collection effect do not exist around the tips of the optical fibers 20 and 112, and thus the light propagating through the optical fibers 20 and 112 does not cause the photochemical reaction. That is, the dust collection effect at the tips of the optical fibers 20 and 112 can be suppressed.

In this example, laser light having a wavelength in the range of 350 to 500 nm, which is likely to cause the dust collection effect, propagates through the optical fibers 20 and 112. Therefore, use of the structure illustrated in FIG. 4 is particularly effective.

In the case where the inside of the connector 124 is degassed before the inert gas is introduced into the connector 124, it is possible to suppress the dust collection effect with higher reliability.

In the structure illustrated in FIG. 4, the optical fibers 20 and 112 are not fused. Therefore, the optical fibers 20 and 112 can be easily connected without an elaborated fusion machine. In addition, the ferrules 113 and 114 can be easily detached from the connector 124 by loosening and taking out the bolts 129. Thus, it is possible to easily reconnect the optical fibers 20 and 112 after the optical fibers are once connected.

Further, in the structure illustrated in FIG. 4, the optical fibers 20 and 112 can be automatically brought into coaxial alignment by simply inserting the ferrules 113 and 114 into the sleeve tube 120, which guides the ferrules 113 and 114. Therefore, the operation for alignment of the optical fibers is easy.

Nitrogen gas and rare gas are preferable examples of the inert gas used in the above structure for connection of optical fibers. In addition, it is preferable that the inert gas contain one or a mixture of oxygen gas, halogen gas, and halide gas at a concentration of 1 ppm to 30%. The examples of the halogen gas and halide gas which are indicated to be preferable for use in the package 50 in the first embodiment are also preferable for use in the structure of FIG. 4.

When the oxygen content in the inert gas is 1 ppm or more, deterioration of the optical fibers 20 and 112 can be suppressed more effectively. This is because the oxygen contained in the inert gas oxidizes and decomposes solid materials produced by photodecomposition of hydrocarbon components. Alternatively, in order to contain oxygen in the sealed atmosphere, it is possible to fill the connector 124 with the clean air (i.e., the mixed gas having the composition of the atmosphere).

Alternatively, when at least one of halogen gas and halide gas is contained in the inert gas, the inclusion of the at least one of halogen gas and halide gas in the inert gas can also effectively suppress deterioration of the optical fibers 20 and 112 as the inclusion of oxygen gas. Although inclusion of even a very small amount of halogen or halide gas (halogen-based gas) produces the effect of suppressing the deterioration of the optical fibers 20 and 112, in order to make this effect remarkable, it is preferable that the concentration of halogen or halide gas in the sealed atmosphere be 1 ppm or more. The inclusion of halogen or halide gas in the sealed atmosphere suppresses the deterioration of the optical fibers 20 and 112 because the halogen or halide gas in the sealed atmosphere decomposes deposited materials which are produced by photodecomposition of organic silicon compound gas.

Since the tips of the optical fibers 20 and 112 are fixed so as to be in close contact, it is unnecessary to coat the tips with films. In the case where the tips are not coated with films, no steplike change occurs in the refraction index, and normally the coupling efficiency of the propagation light is maximized.

However, it is possible to coat the tips with films when necessary. In this case, if the outermost layers of the films are made of a material which is reactive with halogen-based gas, such as oxides or nitrides of silicon (Si), molybdenum (Mo), chromium (Cr), tin (Sn), or zirconium (Zr), the outermost layers are likely to be etched, and therefore the reliability of devices using the optical fibers 20 and 112 decreases.

Consequently, it is preferable that the outermost layers of the films covering the tips of the optical fibers 20 and 112 be made of a material which is inert to halogen-based gas, such as oxides or nitrides of indium (In), gallium (Ga), aluminum (Al), titanium (Ti), or tantalum (Ta)

Further, the connector 124 can be filled with inert gas by introducing pressurized inert gas into the connector 124 through the valve 125, instead of using the aforementioned process of introducing the inert gas.

Furthermore, the connector 124 can be sealed by press-fitting the ferrules 113 and 114 into the sleeve tube 120, instead of using the O-rings 127 and 128.

<Second Structure>

Next, the second structure for connecting optical fibers and a manner of termination associated with the second structure are explained below with reference to FIG. 5, which is a cross-sectional side view of the second structure for connecting optical fibers. In this case, the termination of the optical fiber 20 is also realized by attachment of the ferrule 113.

Figure 5:
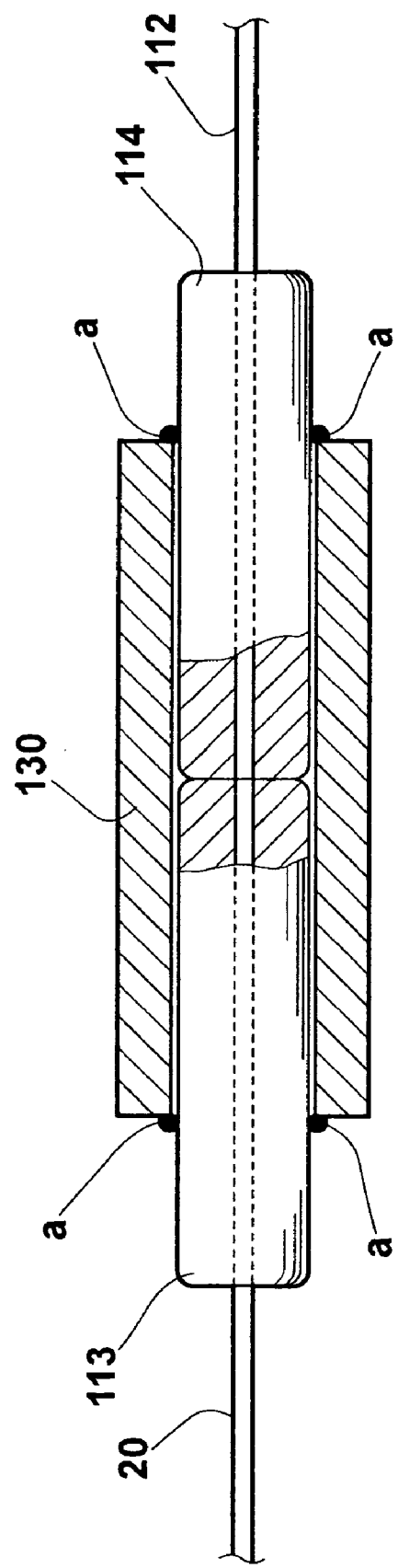
FIG. 5 is a cross-sectional side view of a second structure for connecting optical fibers.

In the second structure illustrated in FIG. 5, near-end portions of two optical fibers 20 and 112 are respectively inserted into and fixed to the ferrules 113 and 114, and the ferrules 113 and 114 are inserted into a cylindrical sleeve 130 from both ends of the cylindrical sleeve 130. In addition, the ferrules 113 and 114 are fixed to the cylindrical sleeve 130 in such a manner that the tips of the optical fiber cores are in contact with and pressed against each other. The ferrules 113 and 114 are fixed to the cylindrical sleeve 130 so as to be sealed along the entire circumferences of the ferrules 113 and 114, for example, at the positions indicated by black circles a in FIG. 5 by using, for example, a solder. The inside of the cylindrical sleeve 130 is filled with inert gas by fixing the ferrules 113 and 114 to the cylindrical sleeve 130 in an inert gas atmosphere.

The second structure illustrated in FIG. 5 has the same advantages as the first structure illustrated in FIG. 4 except that it is impossible to reuse and reconnect the optical fibers 20 and 112 after the optical fibers 20 and 112 are once connected by using the second structure.

In the first and second structures illustrated in FIGS. 4 and 5, it is possible to use a liquid which is transparent to the light propagating through the optical fibers 20 and 112 and is not decomposed by the light, instead of the inert gas. In this case, the advantages of the first and second structures are not changed. An example of the above liquid is pure water.

<Third Structure>

Next, the third structure for connecting optical fibers and a system containing the third structure are explained below with reference to FIGS. 6 and 7, which are a schematic perspective view and a cross-sectional side view of the third structure for connecting optical fibers and a peripheral system.

Figure 6:
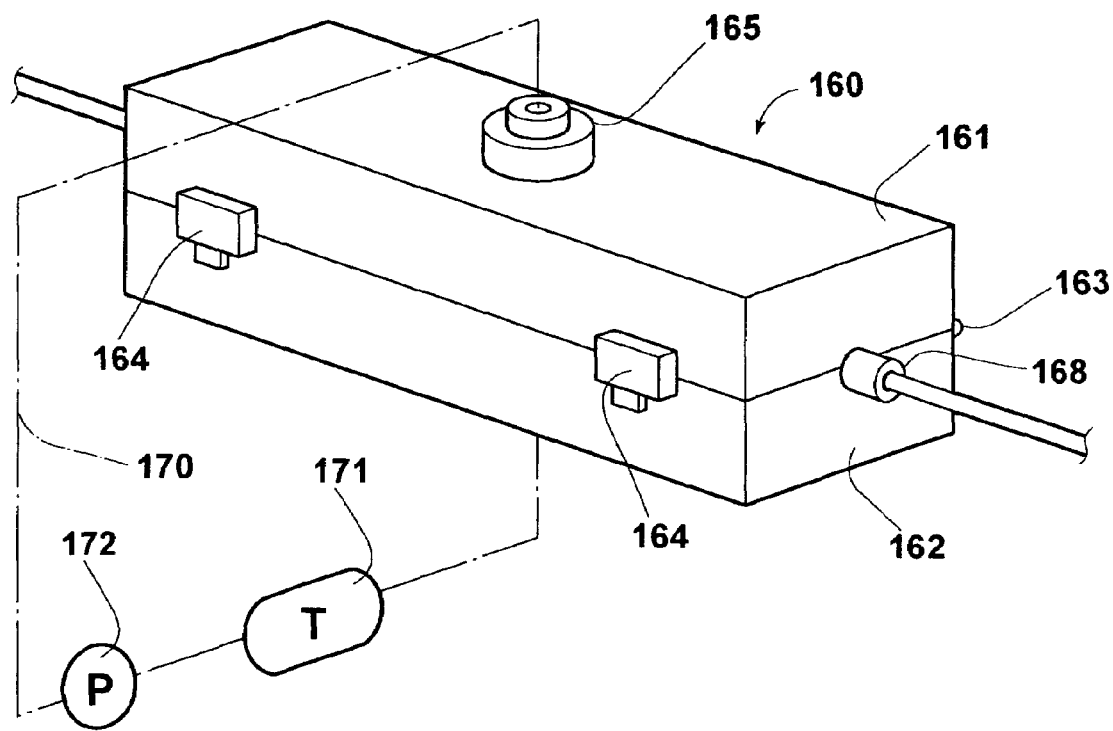
FIG. 6 is a schematic perspective view of a third structure for connecting optical fibers and a peripheral system.
Figure 7:
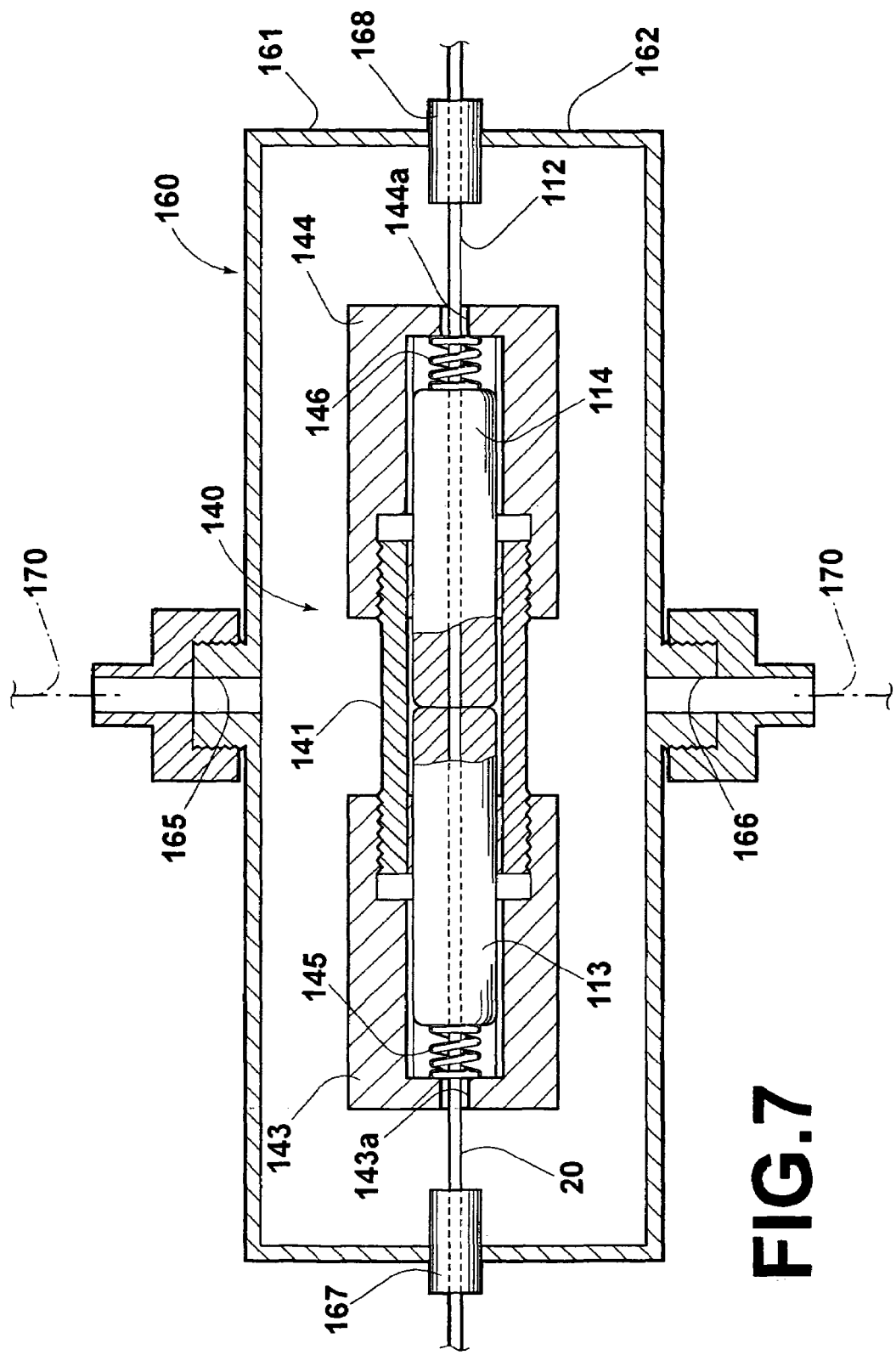
FIG. 7 is a cross-sectional side view of the third structure for connecting optical fibers.

In the system containing the third structure illustrated in FIGS. 6 and 7, a general connector 140 is contained in a container 160, and the peripheral system is provided for circulating inert gas through the container 160.

In the third structure, as illustrated in FIG. 7, near-end portions of two optical fibers 20 and 112 are respectively inserted into and fixed to the ferrules 113 and 114, and the ferrules 113 and 114 are inserted into a sleeve tube 141 from both ends of the sleeve tube 141. In addition, outer tubes 143 and 144 hold the rear portions of the ferrules 113 and 114, respectively. In addition, the outer tubes 143 and 144 have through holes through which the optical fibers 20 and 112 pass. Further, a compression spring 145 is arranged between the bottom of the outer tube 143 and the ferrule 113, and a compression spring 146 is arranged between the bottom of the outer tube 144 and the ferrule 114. That is, the termination of the optical fiber 20 is realized by attaching the ferrule 113, the outer tube 143, and the compression spring 145 to the optical fiber 20.

Male threads are formed on both near-end portions of the outer surface of the sleeve tube 141, and female threads are formed on near-end portions of the internal surfaces of the outer tubes 143 and 144 so that the female threads engage with the male threads.

The structure illustrated in FIGS. 6 and 7 is realized as follows.

First, the front portions of the ferrules 113 and 114 are inserted into the sleeve tube 141, and the rear portions of the ferrules 113 and 114 are respectively inserted into the outer tubes 143 and 144. Thereafter, the outer tubes 143 and 144 are engaged with the sleeve tube 141 by screwing the outer tubes 143 and 144 onto the sleeve tube 141 until the tips of the ferrules 113 and 114 are brought into contact. Then, the outer tubes 143 and 144 are further screwed forward on the sleeve tube 141 so that the tips of the ferrules 113 and 114 (i.e., the tips of the optical fibers 20 and 112) are pressed against each other. Thus, the optical fibers 20 and 112 are optically connected.

The container 160 has a two-part structure constituted by an upper part 161 and a lower part 162. The upper and lower parts 161 and 162 are swingably connected by hinges 163, and can be integrally fixed to each other by using latches 164. A gas inlet 165 and a gas outlet 166 are arranged in the upper and lower parts 161 and 162, respectively. Half-round openings are formed in opposite side walls of each of the upper and lower parts 161 and 162 so that cylindrical fiber passages 167 and 168 can be arranged through round openings in opposite side walls of the container 160, where the round openings are realized by the half-round openings when the upper and lower parts 161 and 162 are integrally fixed to each other. The fiber passages 167 and 168 are formed of an elastic material such as fluorocarbon rubber, and have through holes through which the optical fibers 20 and 112 can be drawn in such a manner that the round openings in the opposite side walls of the container 160 are airtightly closed with the fiber passages 167 and 168 and the optical fibers 20 and 112 when the upper and lower parts 161 and 162 are integrally fixed to each other.

The gas inlet 165 and the gas outlet 166 are connected to gas-circulation piping 170. A tank 171 and a gas pump 172 are arranged in the gas-circulation piping 170, where the tank 171 stores the inert gas as mentioned before, and the gas pump 172 supplies the inert gas into the container 160. In the example illustrated in FIG. 6, a fluid circulation system is realized by the gas-circulation piping 170 with the tank 171 and the gas pump 172.

Before the optical fibers 20 and 112 are optically connected by using the connector 140 in the aforementioned manner, the optical fibers 20 and 112 are respectively threaded through the fiber passages 167 and 168. The connector 140 is held on the bottom surface of the lower part 162. Thereafter, the upper and lower parts 161 and 162 are integrally fixed to each other and tightly sealed by covering the lower part 162 with the upper part 161 and setting the latches 164. Thus, the connector 140 in which the tips of the optical fibers 20 and 112 are optically connected is contained in the container 160. In addition, in order to secure the airtightness between the upper and lower parts 161 and 162, it is preferable that the edges of the upper and lower parts 161 and 162 which are to be brought into contact be coated with an elastic material such as fluorocarbon rubber.

After the connector 140 is contained in the container 160, the gas pump 172 is activated, so that the inert gas stored in the tank 171 circulates through the container 160. It is preferable that the inert gas is the same as that used in the first structure for connecting optical fibers.

In the case where the connector 140 is filled with the inert gas as mentioned before, and at least portions of the tips of the cores of the optical fibers 20 and 112 are not in contact, the at least portions are surrounded by the inert gas. Therefore, organic materials and the like which cause the aforementioned dust collection effect do not exist around the tips of the optical fibers 20 and 112, and thus the light propagating through the optical fibers 20 and 112 does not cause the photochemical reaction. That is, the dust collection effect at the tips of the optical fibers 20 and 112 can be suppressed.

In this example, laser light having a wavelength in the range of 350 to 500 nm, which is likely to cause the dust collection effect, propagates through the optical fibers 20 and 112. Therefore, use of the structure illustrated in FIGS. 6 and 7 is particularly effective.

In the case where the container 160 containing the connector 140 is degassed before the inert gas is introduced into the container 160, it is possible to suppress the dust collection effect with higher reliability.

In the structure illustrated in FIGS. 6 and 7, the optical fibers 20 and 112 are not fused. Therefore, the optical fibers 20 and 112 can be easily connected without an elaborated fusion machine. In addition, the ferrules 113 and 114 can be easily detached from the connector 140 by loosening and taking out the outer tubes 143 and 144. Therefore, it is possible to easily reconnect the optical fibers 20 and 112 after the optical fibers are once connected.

In addition, in the structure illustrated in FIGS. 6 and 7, the optical fibers 20 and 112 can be automatically brought into coaxial alignment by simply inserting the ferrules 113 and 114 into the sleeve tube 141, which guides the ferrules 113 and 114. Therefore, the operation for alignment of the optical fibers is easy.

When the inert gas contains one or a mixture of oxygen gas, halogen gas, and halide gas at a concentration of 1 ppm or more, the structure illustrated in FIGS. 6 and 7 has the same advantages as the first structure illustrated in FIG. 4.

Further, as in the first and second structures illustrated in FIGS. 4 and 5, it is possible to use a liquid (e.g., pure water) which is transparent to the light propagating through the optical fibers 20 and 112 and is not decomposed by the light, instead of the inert gas.

Furthermore, it is possible to close the container 160 by closing or dispensing with the gas inlet 165 and the gas outlet 166, and fill the container 160 with inert gas or a liquid such as pure water.

<Fourth Structure>

Next, the fourth structure for connecting optical fibers and a manner of termination associated with the fourth structure are explained below with reference to FIG. 8, which is a cross-sectional side view of the fourth structure for connecting optical fibers.

Figure 8:
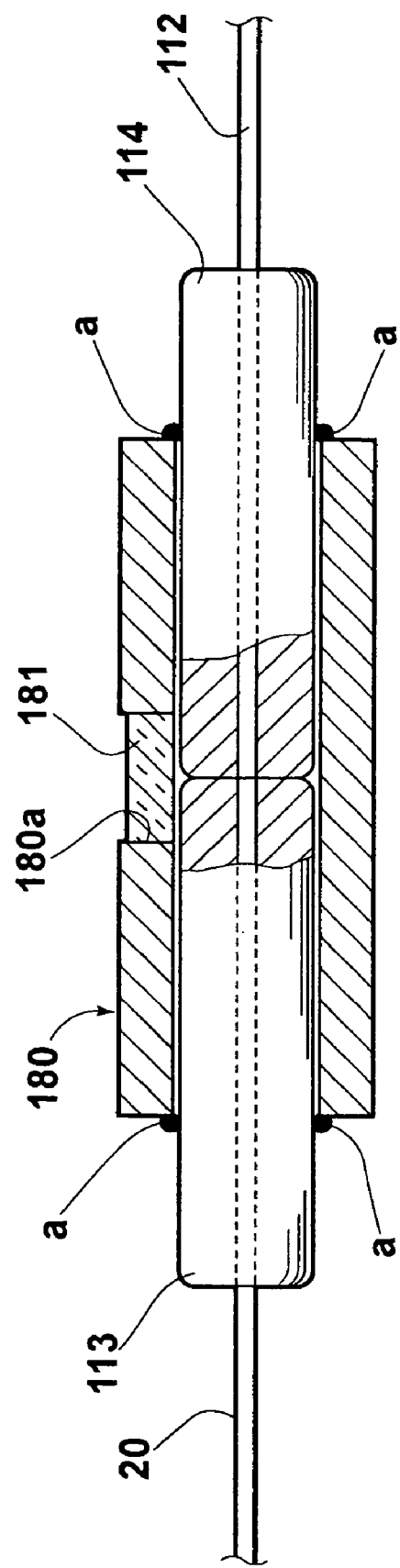
FIG. 8 is a cross-sectional side view of a fourth structure for connecting optical fibers.

In the fourth structure illustrated in FIG. 8, near-end portions of two optical fibers 20 and 112 are respectively inserted into and fixed to the ferrules 113 and 114, and the ferrules 113 and 114 are inserted into a cylindrical sleeve 180 from both ends of the cylindrical sleeve 180. In addition, the ferrules 113 and 114 are fixed to the cylindrical sleeve 180 in such a manner that the tips of the optical fiber cores are in contact with and pressed against each other. The ferrules 113 and 114 are respectively fixed to the cylindrical sleeve 180 so as to be sealed along the entire circumferences of the ferrules 113 and 114, for example, at the positions indicated by black circles a in FIG. 8 by using, for example, a solder.

In the example of FIG. 8, the termination of the optical fiber 20 is also realized by attachment of the ferrule 113.

An opening 180a is formed at approximately the center of the length of the cylindrical sleeve 180. After the ferrules 113 and 114 are fixed to the cylindrical sleeve 180, molten low-melting-point glass 181 is poured into the opening 180a. The flux of the molten low-melting-point glass 181 pushes out air from the vicinities of the tips of the optical fibers 20 and 112, spreads through the vicinities of the tips, gradually cools, and solidifies.

In this example, laser light having a wavelength in the range of 350 to 500 nm propagates through the optical fibers 20 and 112. The low-melting-point glass 181 is transparent to the light propagating through the optical fibers 20 and 112 and is not decomposed by the light.

As indicated above, in the fourth structure illustrated in FIG. 8, the tips of the optical fibers 20 and 112 including the tips of the cores are isolated from the outside by the low-melting-point glass 181 which is solidified after the molten low-melting-point glass 181 is supplied to the vicinities of the tips of the optical fibers 20 and 112. Therefore, in the case where at least portions of the tips of the cores of the optical fibers 20 and 112 are not in contact, the at least portions are in contact with the low-melting-point glass 181. Thus, organic materials and the like which cause the aforementioned dust collection effect do not exist around the tips of the optical fibers 20 and 112, and the light propagating through the optical fibers 20 and 112 does not cause the photochemical reaction. That is, the dust collection effect at the tips of the optical fibers 20 and 112 can be reliably suppressed.

Third and Fourth Embodiments

The one or more semiconductor laser elements used in the present invention may be realized by an array of single-cavity semiconductor laser elements, or a single multi-cavity semiconductor laser element (LD bar), or an array of multi-cavity semiconductor laser elements, or a combination of at least one single-cavity semiconductor laser element and at least one multi-cavity semiconductor laser element.

Figure 9:
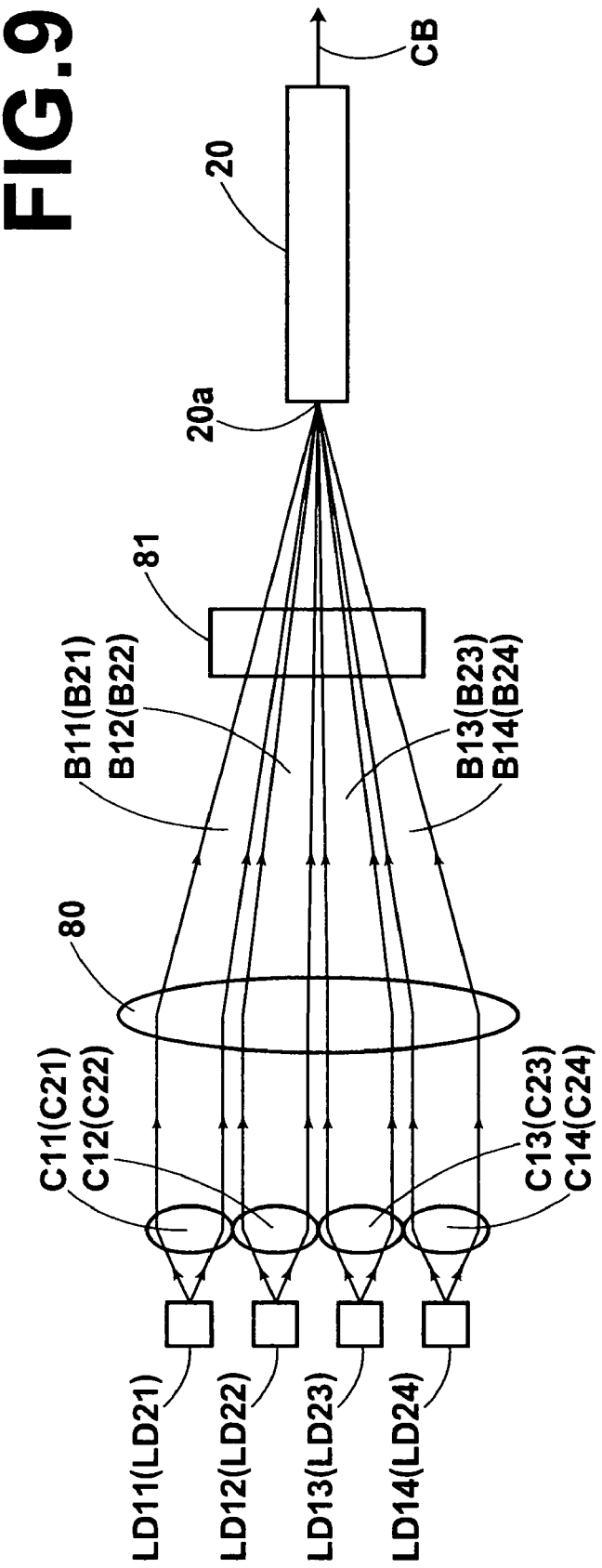
FIG. 9 is a plan view of a portion of a laser module according to a third embodiment of the present invention.

FIG. 9 is a plan view of a portion of a laser module according to the third embodiment of the present invention. In the laser module according to the third embodiment, as illustrated in FIG. 9, eight semiconductor laser elements are stacked in upper and lower layers. Specifically, four semiconductor laser elements LD11, LD12, LD13, and LD14 are arranged along the horizontal direction in the upper layer, and four semiconductor laser elements LD21, LD22, LD23, and LD24 are arranged along the horizontal direction in the lower layer.

Divergent laser beams B11, B12, B13, B14, B21, B22, B23, and B24 emitted from the semiconductor laser elements LD11, LD12, LD13, LD14, LD21, LD22, LD23, and LD24 are respectively collimated by collimator lenses C11, C12, C13, C14, C21, C22, C23, and C24, and condensed by first and second cylindrical lenses 80 and 81 so as to converge on the light-entrance end face 20a of the optical fiber 20. Therefore, the laser beams B1, B12, B13, B14, B21, B22, B23, and B24 enter the optical fiber 20, and are combined into a single combined laser beam CB, which is then outputted from the optical fiber 20 with high output power.

The spread angle of each of the laser beams B1, B12, B13, B14, B21, B22, B23, and B24 is different between the first direction parallel to the junction planes of the semiconductor laser element (parallel to the plane of FIG. 9) and the second direction perpendicular to the junction planes. On the other hand, the numerical aperture of the optical fiber 20 is axisymmetric. Therefore, in the laser module of FIG. 9, the first cylindrical lens 80 condenses the laser beams B11, B12, B13, B14, B21, B22, B23, and B24 in the first direction parallel to the plane of FIG. 9, and the second cylindrical lens 81 condenses the laser beams B11, B12, B13, B14, B21, B22, B23, and B24 in the second direction perpendicular to the plane of FIG. 9, in such a manner that the convergent angle of the laser beams B11, B12, B13, B14, B21, B22, B23, and B24 in each of the first and second directions (i.e., in any direction between the first and second directions) is within the angle corresponding to the numerical aperture.

Figure 10:
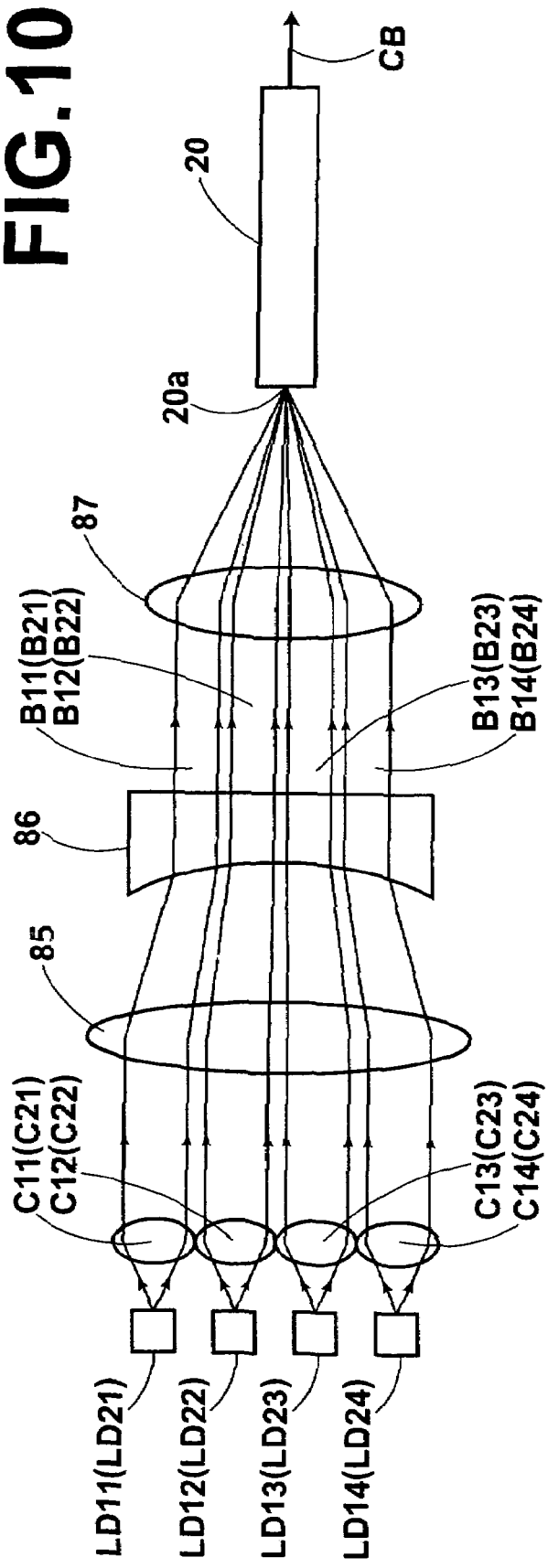
FIG. 10 is a plan view of a portion of a laser module according to a fourth embodiment of the present invention.

FIG. 10 is a plan view of a portion of a laser module according to the fourth embodiment of the present invention. The laser module according to the fourth embodiment is different from the third embodiment in the optical condensing system. Specifically, the optical condensing system in the laser module of FIG. 10 comprises first and second cylindrical lenses 85 and 86 and a condensing lens 87. The first cylindrical lens 85 condenses the laser beams B11, B12, B13, B14, B21, B22, B23, and B24 in a first direction parallel to the plane of FIG. 10, the second cylindrical lens 86 diverges the laser beams B11, B12, B13, B14, B21, B22, B23, and B24 in the first direction so as to collimate laser beams B11, B12, B13, B14, B21, B22, B23, and B24, and the condensing lens 87 condenses the collimated laser beams B11, B12, B13, B14, B21, B22, B23, and B24 in the second direction perpendicular to the plane of FIG. 10. The optical condensing system illustrated in FIG. 10 is effective at making the laser beams B11, B12, B13, B14, B21, B22, B23, and B24 converge and enter the optical fiber 20 at identical convergent angles in all directions perpendicular to the optical axis of the optical fiber 20.

In the laser modules according to the third and fourth embodiments, it is possible to use light-source packages which are basically similar to the light-source packages used in the first and second embodiments. Since, in the laser modules according to the third and fourth embodiments, the semiconductor laser elements LD11, LD12, LD13, LD14, LD21, LD22, LD23, and LD24 are arranged so that the laser beams B11, B12, B13, B14, B21, B22, B23, and B24 emitted from the semiconductor laser elements LD11, LD12, LD13, LD14, LD21, LD22, LD23, and LD24 are two-dimensionally arrayed along a plane perpendicular to the light-emission axes of the semiconductor laser elements LD11, LD12, LD13, LD14, LD21, LD22, LD23, and LD24, the use of the light-source packages according to the present invention is particularly effective in the third and fourth embodiments at reducing the costs of the laser modules by reducing the volumes of the light-source packages.

In addition, the number of stacked layers in each of which semiconductor laser elements are arrayed is not limited to two, and may be three or more.

Further, the present invention can be applied to laser modules in each of which combining of laser beams is not performed, and a single laser beam emitted from a single semiconductor laser element is coupled to an optical fiber. In this case, it is also possible to achieve the aforementioned advantage of prevention of contamination.

Other Optical Condensing Systems

Hereinbelow, other examples of the optical condensing systems used in the laser modules according to the present invention are explained with reference to FIGS. 11 to 15. The following optical condensing systems are identical in having a cylindrical lens 91 and an anamorphic lens 92 (which replace, for example, the aforementioned first cylindrical lens 80 and the second cylindrical lens 81 in the construction of FIG. 9), and different in the structure for fixing the cylindrical lens 91 and the anamorphic lens 92. Even when the following optical condensing systems are used, the aforementioned packages according to the present invention can be used. Therefore, the explanations on the packages are not repeated.

<First Optical Condensing System>

Figure 11:
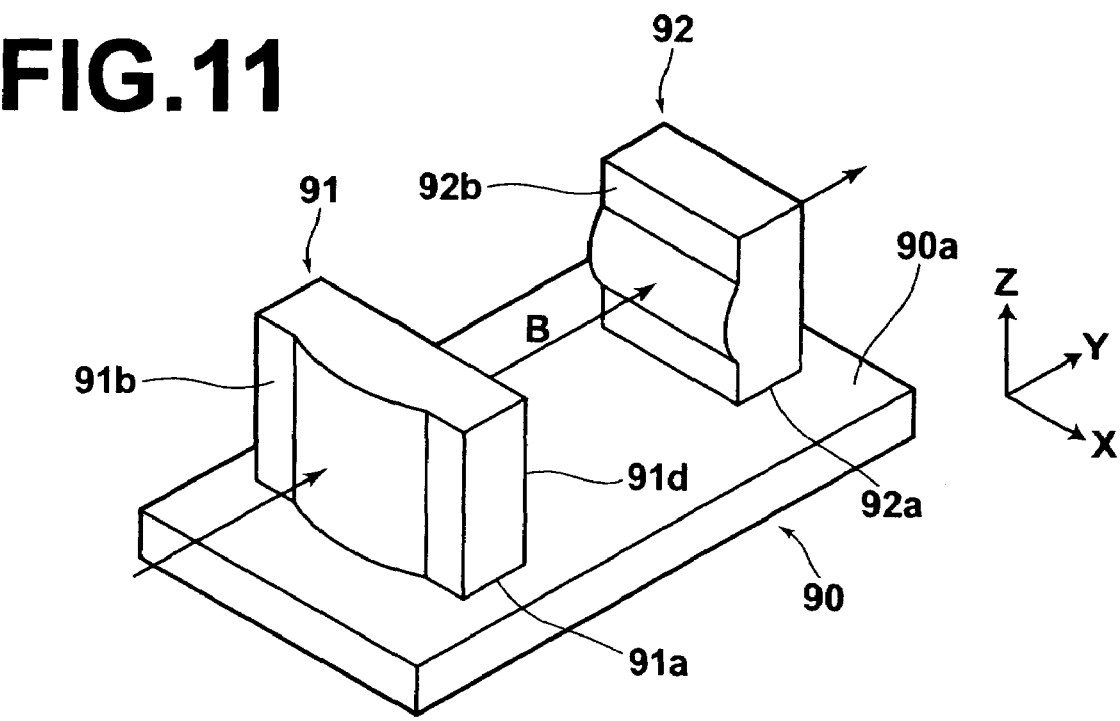
FIG. 11 is a schematic perspective view of a first example of the optical condensing system used in the laser modules according to the present invention.

FIG. 11 is a schematic perspective view of a first example of the optical condensing system used in the laser modules according to the present invention. In FIG. 11, the X, Y, and Z directions are perpendicular to each other, the Y direction corresponds to the direction of the optical axis, and the Z direction is perpendicular to an upper surface 90a of a lens holder 90, which holds the cylindrical lens 91 and the anamorphic lens 92. In FIG. 11, the one or more laser beams emitted from the one or more semiconductor laser elements are collectively represented by the laser beam B. In the optical condensing system of FIG. 11, the cylindrical lens 91 condenses the laser beam B only in the X-Y plane, and the anamorphic lens 92 condenses the laser beam B only in the Y-Z plane, in such a manner that the diameters of the converged laser beam at the core end face of the optical fiber (not shown) in the X and Y directions become desired values.

The structures for fixing the cylindrical lens 91 and the anamorphic lens 92 in the optical condensing system of FIG. 11 are explained below.

The cylindrical lens 91 and the anamorphic lens 92 are fixed to the lens holder 90 by bonding the bottom surfaces 91a and 92a of the cylindrical lens 91 and the anamorphic lens 92 to the upper surface 90a of the lens holder 90, which is flat. The cylindrical lens 91 is formed by precision glass molding so that the bottom surface 91a is perpendicular to the symmetry plane of the cylindrical lens 91 with the precision of +30", where the symmetry plane of the cylindrical lens 91 is a plane containing the normal to a rear-end surface 91d of the cylindrical lens 91 (which is flat) and the central axis of the cylindrical surface of the cylindrical lens 91. The anamorphic lens 92 is also formed by precision glass molding so that the bottom surface 92a of the anamorphic lens 92 is parallel to the symmetry plane of the anamorphic lens 92 with the precision of ±30", where the symmetry plane of the anamorphic lens 92 is a plane containing the normal to a rear-end surface 92d of the anamorphic lens 92 (which is flat) and the central axis of the cylindrical surface of the anamorphic lens 92.

The cylindrical lens 91 and the anamorphic lens 92 are required to be aligned so that the straight line which is perpendicular to the rear-end surface 91d and intersects with the central axis of the cylindrical surface of the cylindrical lens 91 is identical to the straight line which is perpendicular to the rear-end surface 92d and intersects with the central axis of the cylindrical surface of the cylindrical lens 92. The identical straight line is the optical axis of the optical condensing system. Two conditions are necessary for realizing the above alignment. The first condition is that the projection of the central axis of the cylindrical surface of the cylindrical lens 91 onto the Y-Z plane is perpendicular to the symmetry plane of the anamorphic lens 92, and the projection of the central axis of the cylindrical surface of the cylindrical lens 91 onto the Z-X plane is perpendicular to the central axis of the cylindrical surface of the anamorphic lens 92. Since the cylindrical lens 91 and the anamorphic lens 92 are formed with the aforementioned precision, the first condition is automatically satisfied when the cylindrical lens 91 and the anamorphic lens 92 are placed on the flat upper surface 90a of the lens holder 90.

The second condition is that the projection of the symmetry plane of the cylindrical lens 91 onto the X-Y plane is perpendicular to the central axis of the cylindrical surface of the cylindrical lens 92. Therefore, reference surfaces 91b and 92b respectively perpendicular to the symmetry planes (i.e., respectively parallel to the rear-end surfaces) of the cylindrical lens 91 and the anamorphic lens 92 are formed on the cylindrical lens 91 and the anamorphic lens 92. Since the cylindrical lens 91 and the anamorphic lens 92 are formed by precision glass molding, the precision of the perpendicularity of the reference surfaces 91b and 92b can be maintained as high as ±30".

The orientations and the positions of the cylindrical lens 91 and the anamorphic lens 92 are adjusted at the time of assembly of the optical condensing system as follows.

First, the orientations of the cylindrical lens 91 and the anamorphic lens 92 are adjusted on the lens holder 90 so as to make the reference surfaces 91b and 92b parallel to each other, by use of a high-precision angle measurement device such as the laser auto-collimator having the precision of 10". Thus, the projection of the symmetry plane of the cylindrical lens 91 onto the X-Y plane becomes perpendicular to the central axis of the cylindrical surface of the cylindrical lens 92.

Then, the relative positions between the cylindrical lens 91 and the anamorphic lens 92 in the X direction are adjusted so as to align the central position of the cylindrical lens 92 in the longitudinal direction with the symmetry plane of the cylindrical lens 91. Thus, the orientations and the positions of the cylindrical lens 91 and the anamorphic lens 92 are adjusted so that the straight line which is perpendicular to the rear-end surface 91d and intersects with the central axis of the cylindrical surface of the cylindrical lens 91 coincides with the straight line which is perpendicular to the rear-end surface 92d and intersects with the central axis of the cylindrical surface of the cylindrical lens 92.

While the above arrangement is maintained, the cylindrical lens 91 and the anamorphic lens 92 are fixed to the lens holder 90, for example, by making an adhesive spread between the bottom surfaces 91a and 92a of the cylindrical lens 91 and the anamorphic lens 92 and the upper surface 90a of the lens holder 90.

As indicated above, when the optical condensing system of FIG. 11 is used, the cylindrical lens 91 and the anamorphic lens 92 can be aligned and fixed with high precision, without using a lens holder having a complex structure, for example, as indicated in Japanese Unexamined Patent Publication No. 10(1998)-213769. Therefore, a high-precision optical condensing system can be produced at low cost.

<Second Optical Condensing System>

Figure 12:
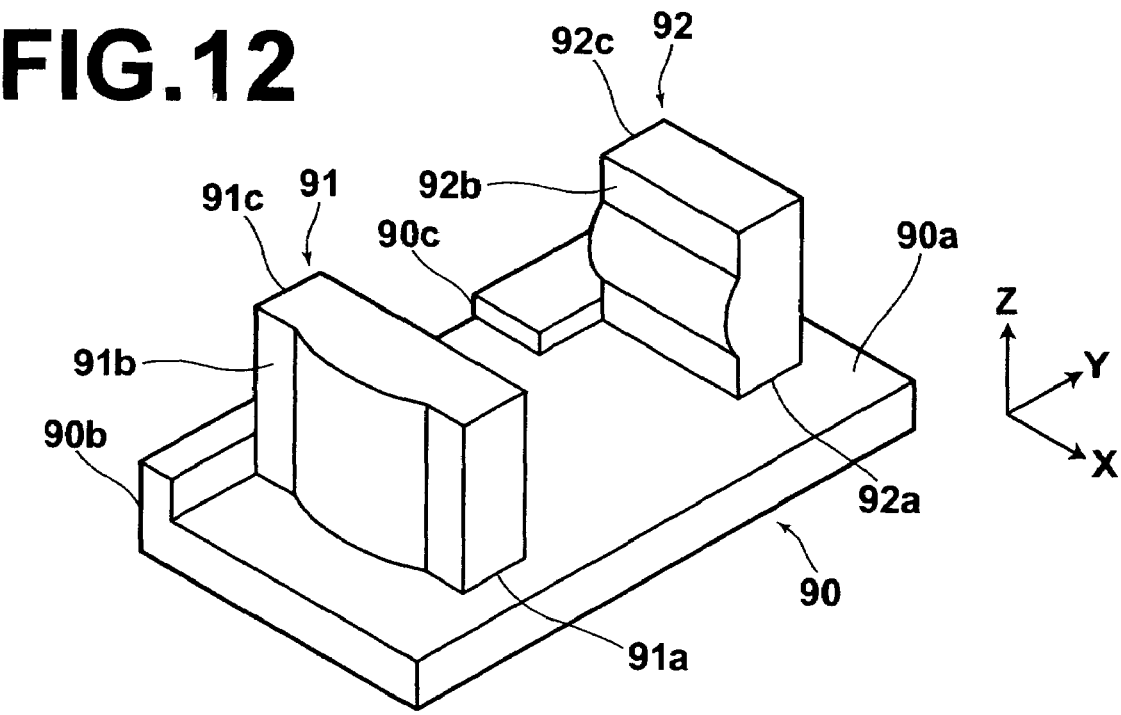
FIG. 12 is a schematic perspective view of a second example of the optical condensing system used in the laser modules according to the present invention.

FIG. 12 is a schematic perspective view of a second example of the optical condensing system used in the laser modules according to the present invention. In the optical condensing system of FIG. 12, a first positioning guide 90b and a second positioning guide 90c are formed on the upper surface 90a of the lens holder 90. The first positioning guide 90b is arranged for positioning the cylindrical lens 91, and has an internal side surface which is parallel to the Y-Z plane. The second positioning guide 90c is arranged for positioning the anamorphic lens 92, and has an internal side surface which is parallel to the Y-Z plane. The cylindrical lens 91 is produced by precision glass molding and has a side surface 91c, which is parallel to the symmetry plane of the cylindrical lens 91 with the high precision of ±30", and located at a predetermined distance from the symmetry plane of the cylindrical lens 91 with the precision of ±10 micrometers. The anamorphic lens 92 is also produced by precision glass molding and has a side surface 92c, which is perpendicular to the central axis of the cylindrical surface of the anamorphic lens 92 with the high precision of ±30", and located at a predetermined distance from the center of the anamorphic lens 92 in the longitudinal direction of the anamorphic lens 92 with the precision of ±10 micrometers.

Thus, the orientations and the positions of the cylindrical lens 91 and the anamorphic lens 92 can be precisely adjusted by positioning the cylindrical lens 91 and the anamorphic lens 92 in such a manner that the side surface 91c of the cylindrical lens 91 is in contact with the internal side surface of the first positioning guide 90b, and the side surface 92c of the anamorphic lens 92 is in contact with the internal side surface of the second positioning guide 90c. That is, in the optical condensing system of FIG. 12, the cylindrical lens 91 and the anamorphic lens 92 can be positioned and aligned as in the optical condensing system of FIG. 11.

<Third Optical Condensing System>

Figure 13:
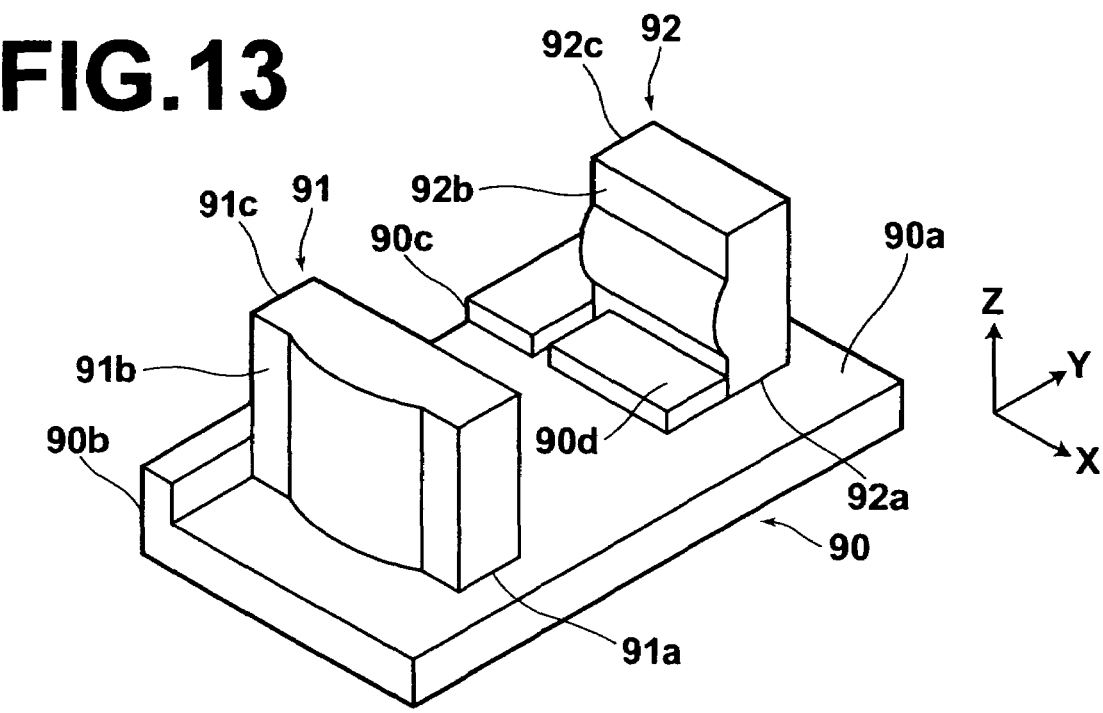
FIG. 13 is a schematic perspective view of a third example of the optical condensing system used in the laser modules according to the present invention.

FIG. 13 is a schematic perspective view of a third example of the optical condensing system used in the laser modules according to the present invention. The optical condensing system of FIG. 13 is different from the optical condensing system of FIG. 12 in that a third positioning guide 90d is further arranged on the upper surface 90a of the lens holder 90. The third positioning guide 90d has a rear end surface which is designed to be in contact with the reference surface 92b of the anamorphic lens 92. The precision in positioning the anamorphic lens 92 is further improved by provision of the third positioning guide 90d.

<Fourth Optical Condensing System>

Figure 14:
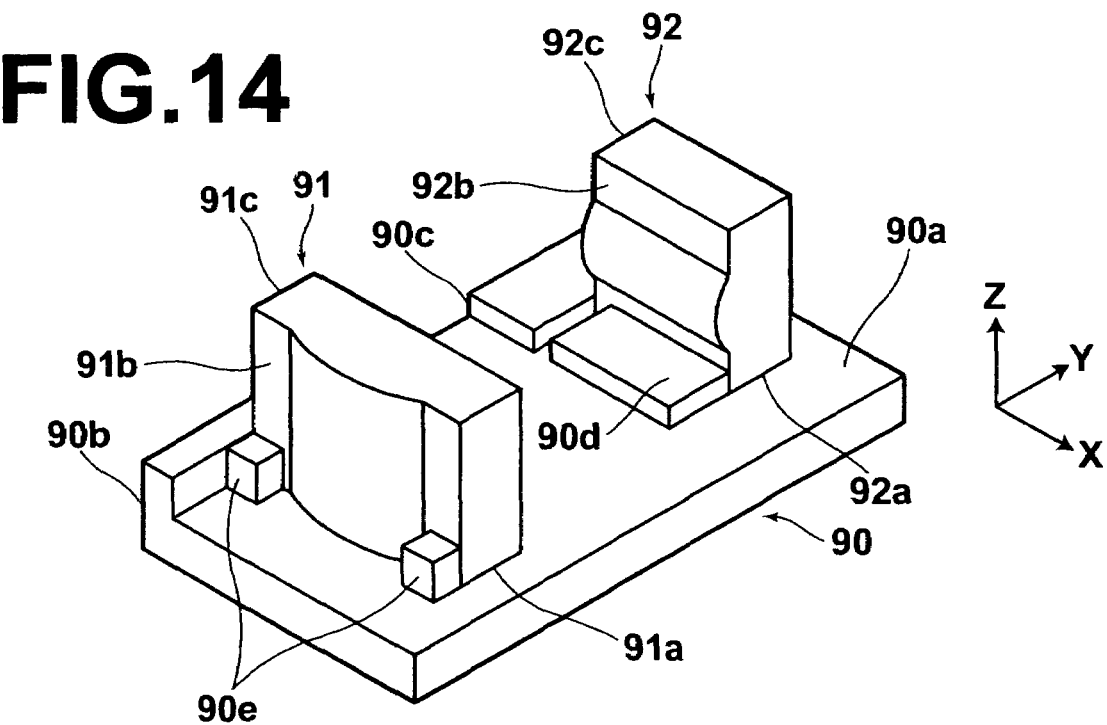
FIG. 14 is a schematic perspective view of a fourth example of the optical condensing system used in the laser modules according to the present invention.

FIG. 14 is a schematic perspective view of a fourth example of the optical condensing system used in the laser modules according to the present invention. The optical condensing system of FIG. 14 is different from the optical condensing system of FIG. 13 in that a fourth positioning guide 90e is further arranged on the upper surface 90a of the lens holder 90. The fourth positioning guide 90e has a rear end surface which is designed to be in contact with the reference surface 91b of the cylindrical lens 91. The precision in positioning the cylindrical lens 91 is further improved by provision of the fourth positioning guide 90e.

<Fifth Optical Condensing System>

Figure 15:
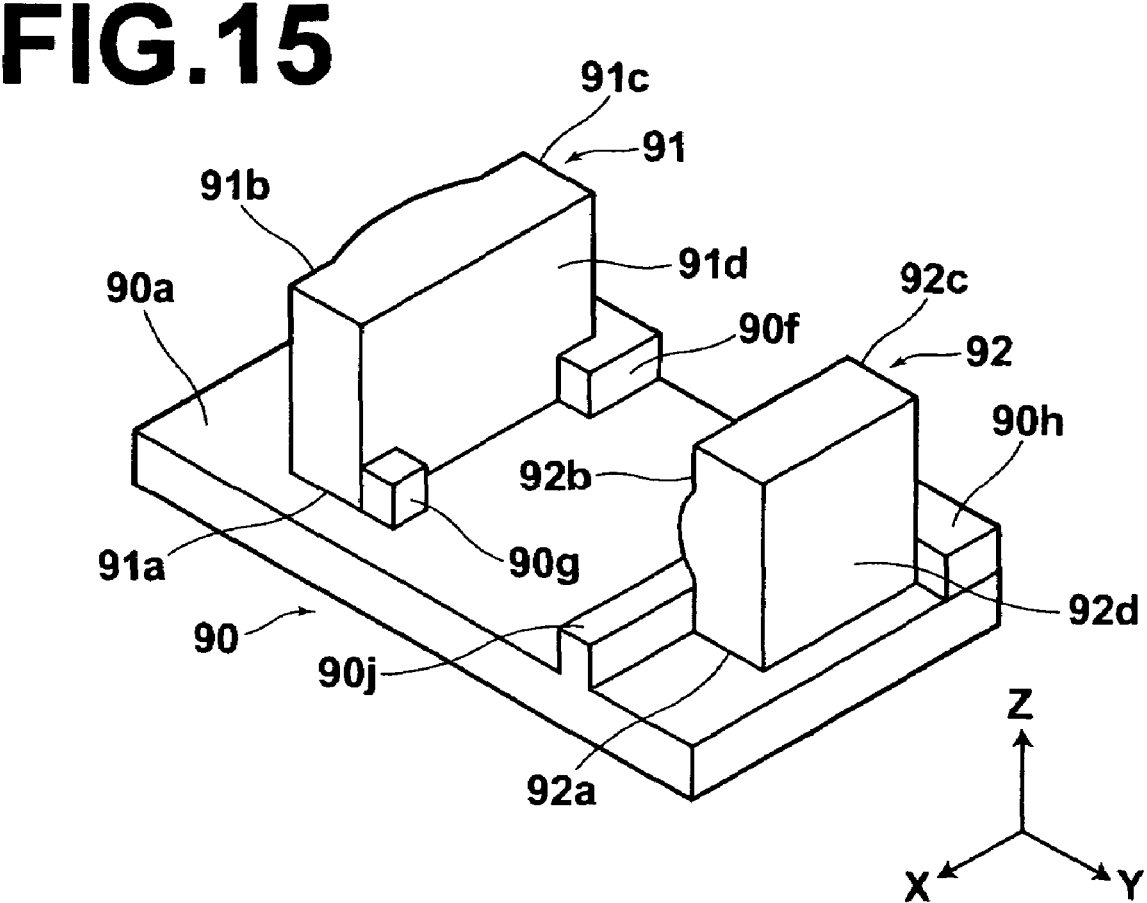
FIG. 15 is a schematic perspective view of a fifth example of the optical condensing system used in the laser modules according to the present invention.

FIG. 15 is a schematic perspective view of a fifth example of the optical condensing system used in the laser modules according to the present invention. The optical condensing system of FIG. 15 is different from the optical condensing system of FIG. 14 in that a fifth positioning guide 90f and a sixth positioning guide 90g are arranged on the upper surface 90a of the lens holder 90, instead of the first positioning guide 90b and the fourth positioning guide 90e, and a seventh positioning guide 90h and an eighth positioning guide 90j are arranged on the upper surface 90a of the lens holder 90, instead of the second positioning guide 90c and the third positioning guide 90d. The fifth positioning guide 90f is designed to be in contact with the side surface 91c and the rear-end surface 91d of the cylindrical lens 91, and the sixth positioning guide 90g is designed to be in contact with the rear-end surface 91d of the cylindrical lens 91. The seventh positioning guide 90h and the eighth positioning guide 90j are designed to be in contact with the side surface 92c and the reference surface 92b, respectively. The precision in positioning the cylindrical lens 91 and the anamorphic lens 92 in the optical condensing system of FIG. 15 is equivalent to the precision in the optical condensing system of FIG. 14.

This application is based upon and claims the benefits of priority from the Japanese patent applications Nos. 2004-217540 and 2005-103812, the entire contents of which are incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A laser module comprising:
   one or more semiconductor laser elements which emit one or more divergent laser beams;
   one or more collimator lenses which collimate said one or more divergent laser beams to obtain one or more collimated laser beams;
   a condensing lens which condenses said one or more collimated laser beams, and make the one or more collimated laser beams converge at a convergence position;
   an optical fiber which has a light-entrance end face and is arranged in such a manner that said convergence position is located on the light-entrance end face;
   a first package which contains said one or more semiconductor laser elements and said one or more collimator lenses, does not contain said condensing lens and said light-entrance end face, and is hermetically sealed;
   a second package which contains said condensing lens, is hermetically sealed, and has lower sealing performance than said first package; and
   a third package, provided outside said second package, wherein the third package contains the light entrance end face of said optical fiber and does not contain said condensing lens.

2. A laser module according to claim 1, wherein said second package contains said first package.

3. A laser module according to claim 1, wherein said first package is hermetically sealed by one of fusion, welding, soldering using a flux-free solder, and adhesion using an adhesive which does not contain a silicon-based organic material.

4. A laser module according to claim 1, wherein said first package is filled with inert gas.

5. A laser module according to claim 4, wherein said inert gas contains one or a mixture of oxygen gas, halogen gas, and halide gas at a concentration of 1 ppm or higher.

6. A laser module according to claim 1, further comprising a second package which is separated from said first package, contains said light-entrance end face of said optical fiber, and is hermetically sealed.

7. A laser module according to claim 6, wherein said second package is hermetically sealed by one of fusion, welding, soldering using a flux-free solder, and adhesion using an adhesive which does not contain a silicon-based organic material.

8. A laser module according to claim 1, wherein said one or more semiconductor laser elements have an oscillation wavelength of 350 to 500 nm.

9. A laser module according to claim 1, wherein said one or more semiconductor laser elements are realized by an array of single-cavity semiconductor laser elements, or a single multi-cavity semiconductor laser element, or an array of multi-cavity semiconductor laser elements, or a combination of at least one single-cavity semiconductor laser element and at least one multi-cavity semiconductor laser element.

10. A laser module according to claim 1, wherein said one or more semiconductor laser elements emit a plurality of laser beams which are combined into a single laser beam in said optical fiber.

11. A laser module comprising:
one or more semiconductor laser elements which emit one or more divergent laser beams;
one or more magnifying condenser lenses which condense said one or more divergent laser beams so as to make the one or more divergent laser beams converge at a convergence position;
an optical fiber which has a light-entrance end face and is arranged in such a manner that said convergence position is located on the light-entrance end face;
a first package which contains said one or more semiconductor laser elements and said one or more magnifying condenser lenses, does not contain said light-entrance end face, and is hermetically sealed;
a second package having a front plate;
a ferrule into which the light-entrance end face of said optical fiber is inserted; and
a receptacle into which an end of said ferrule is inserted, wherein said receptacle is attached to the front plate of said second package such that the light entrance end face of said optical fiber within said ferrule abuts the light entrance face of said second package.

12. A laser module according to claim 11, wherein said first package is hermetically sealed by one of fusion, welding, soldering using a flux-free solder, and adhesion using an adhesive which does not contain a silicon-based organic material.

13. A laser module according to claim 11, wherein said first package is filled with inert gas.

14. A laser module according to claim 13, wherein said inert gas contains one or a mixture of oxygen gas, halogen gas, and halide gas at a concentration of 1 ppm or higher.

15. A laser module according to claim 11, wherein said second package is separated from said first package, and is hermetically sealed.

16. A laser module according to claim 15, wherein said second package is hermetically sealed by one of fusion, welding, soldering using a flux-free solder, and adhesion using an adhesive which does not contain a silicon-based organic material.

17. A laser module according to claim 11, wherein said one or more semiconductor laser elements have an oscillation wavelength of 350 to 500 nm.

18. A laser module according to claim 11, wherein said one or more semiconductor laser elements are realized by an array of single-cavity semiconductor laser elements, or a single multi-cavity semiconductor laser element, or an array of multi-cavity semiconductor laser elements, or a combination of at least one single-cavity semiconductor laser element and at least one multi-cavity semiconductor laser element.

19. A laser module according to claim 11, wherein said one or more semiconductor laser elements emit a plurality of laser beams which are combined into a single laser beam in said optical fiber.

20. A laser module according to claim 19, wherein said one or more semiconductor laser elements have light-emission axes and are arranged so that said plurality of laser beams emitted from the one or more semiconductor laser elements are two-dimensionally arrayed along a plane perpendicular to the light-emission axes.

* * * * *